(12) United States Patent
Lee et al.

(10) Patent No.: US 12,229,362 B2
(45) Date of Patent: Feb. 18, 2025

(54) TRANSPARENT DISPLAY DEVICE WITH TOUCH SENSOR

(71) Applicant: LG Display Co., Ltd., Seoul (KR)

(72) Inventors: MiReum Lee, Paju-si (KR); JaeHee Park, Paju-si (KR); Dojin Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/533,648

(22) Filed: Dec. 8, 2023

(65) Prior Publication Data
US 2024/0211063 A1   Jun. 27, 2024

(30) Foreign Application Priority Data

Dec. 27, 2022  (KR) .......................... 10-2022-0185515

(51) Int. Cl.
*G06F 3/041*    (2006.01)
*G02F 1/1343*   (2006.01)
*G06F 3/044*    (2006.01)

(52) U.S. Cl.
CPC ........ *G06F 3/0412* (2013.01); *G02F 1/13439* (2013.01); *G06F 3/044* (2013.01)

(58) Field of Classification Search
CPC ..... G06F 3/0412; G06F 3/044; G02F 1/13439
See application file for complete search history.

(56) References Cited

U.S. PATENT DOCUMENTS

| | | | |
|---|---|---|---|
| 11,094,724 B2* | 8/2021 | Kim .................. | H01L 27/14616 |
| 2020/0192503 A1* | 6/2020 | Kataya ............... | G06F 3/04182 |
| 2020/0192510 A1* | 6/2020 | Liu ....................... | B32B 15/082 |
| 2020/0192513 A1* | 6/2020 | Zhou ..................... | G06F 3/0412 |
| 2020/0192543 A1* | 6/2020 | Wang ..................... | G06F 3/047 |
| 2020/0194516 A1* | 6/2020 | Kim ....................... | H10K 50/84 |
| 2021/0157188 A1* | 5/2021 | Liu ....................... | G06F 3/0412 |

* cited by examiner

*Primary Examiner* — Sejoon Ahn
(74) *Attorney, Agent, or Firm* — Morgan, Lewis & Bockius LLP

(57) ABSTRACT

A transparent display device may include a substrate, a transmissive area, a non-transmissive area, and a plurality of subpixels provided in the non-transmissive area, having a light emitting element, which may include an anode electrode, a light emitting layer and a cathode electrode. The transparent display device may further include a touch sensor disposed in the transmissive area, including a touch sensor electrode, and a sensing transistor for sensing a voltage of the touch sensor. The cathode electrode of the light emitting element and the touch sensor electrode of the touch sensor may be provided on a same layer and may be separated by a first undercut structure. The cathode electrode may extend to the transmissive area such that the cathode electrode is located in the transmissive area and in the non-transmissive area. The sensing transistor may be disposed to overlap the cathode electrode located in the transmissive area.

18 Claims, 12 Drawing Sheets

TRANSPARENT DISPLAY DEVICE WITH TOUCH SENSOR

CROSS-REFERENCE TO RELATED APPLICATIONS

This application claims the benefit of and priority to Korean Patent Application No. 10-2022-0185515 filed on Dec. 27, 2022, the entirety of which is incorporated herein by reference for all purposes as if fully set forth herein.

BACKGROUND

1. Technical Field

The present disclosure relates to an apparatus and particularly to, for example, without limitation, a transparent display device with a touch sensor.

2. Description of the Related Art

Recently, studies for a transparent display device in which a user may view objects or images positioned at an opposite side through the display device are actively ongoing. The transparent display device may include a display area on which an image is displayed, wherein the display area may include a transmissive area capable of transmitting external light and a non-transmissive area, and may have high light transmittance through the transmissive area. A transparent display device may be provided with a plurality of touch sensors and a plurality of touch lines to implement a touch function.

The description provided in the discussion of the related art section should not be assumed to be prior art merely because it is mentioned in or associated with that section. The discussion of the related art section may include information that describes one or more aspects of the subject technology, and the description in this section does not limit the invention.

SUMMARY

The inventors of the present disclosure have recognized the problems and disadvantages of the related art, have performed extensive research and experiments, and have developed a new invention as described herein. The inventors have realized, among others, that a transparent display device in the related art has technical problems in that it is difficult to form the plurality of touch sensors and the plurality of touch lines, or the manufacturing process is complicated. Further problems include light transmittance being reduced due to the plurality of touch sensors and the plurality of touch lines. In one or more aspects, the subject technology has been made in view of the various technical problems in the related art including the above problems. Accordingly, embodiments of the present disclosure are directed to an apparatus that substantially obviates one or more problems due to limitations and disadvantages of the related art.

One or more aspects of the present disclosure are directed to providing a transparent display device that may minimize loss of light transmittance due to a touch sensor and a touch line.

One or more aspects of the present disclosure are directed to providing a transparent display device that may detect a defective touch sensor among a plurality of touch sensors provided in a touch block.

One or more aspects of the present disclosure are directed to providing a transparent display device that may prevent a short defect from being generated in an undercut area.

In addition to the aspects of the present disclosure described above, further aspects and features of the present disclosure will be clearly understood by those skilled in the art from the present disclosure.

In accordance with one or more aspects of the present disclosure, the above and other advantages can be accomplished by the provision of a transparent display device with a touch sensor. The transparent display device may include a substrate, a transmissive area, a non-transmissive area, and a plurality of subpixels provided in the non-transmissive area, including a light emitting element. The light emitting element may include an anode electrode, a light emitting layer and a cathode electrode. The transparent display device may further include a touch sensor disposed in the transmissive area, including a touch sensor electrode, and a sensing transistor for sensing a voltage of the touch sensor. The cathode electrode of the light emitting element and the touch sensor electrode of the touch sensor may be provided on a same layer and may be separated by a first undercut structure. The sensing transistor may be disposed to overlap the cathode electrode.

In accordance with one or more aspects of the present disclosure, the above and other advantages can be accomplished by the provision of a transparent display device with a touch sensor. The transparent display device may include a substrate, a transmissive area, a non-transmissive area, a plurality of subpixels provided in the non-transmissive area, a first signal line extended in a first direction in the non-transmissive area, a second signal line extended in a second direction in the non-transmissive area, a touch sensor disposed in the transmissive area, and a sensing transistor provided between the touch sensor and the second signal line. The sensing transistor may be electrically connected to the touch sensor to sense a voltage of the touch sensor.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles of the disclosure. In the drawings.

Figure 1:
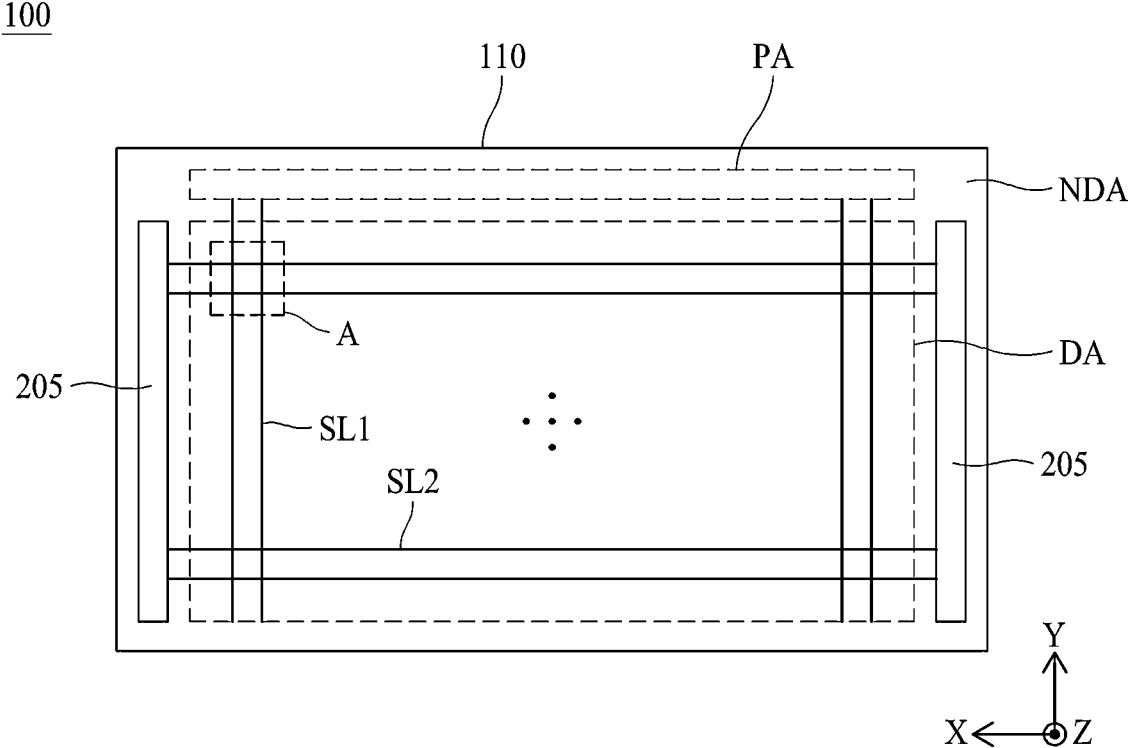
FIG. 1 is a schematic plan view illustrating an example of a transparent display panel.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known methods, functions, structures or configurations may unnecessarily obscure aspects of the present disclosure, the detailed description thereof may have been omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

The shapes, dimensions (e.g., sizes, lengths, widths, heights, thicknesses, locations, radii, diameters, and areas), ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term "comprise," "have," "include," "contain," "constitute," "make up of," "formed of," or the like is used, one or more other elements may be added unless a term such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. The word "exemplary" is used to mean serving as an example or illustration. Embodiments are example embodiments. Aspects are example aspects. "Embodiments," "examples," "aspects" and the like should not be construed to be preferred or advantageous over other implementations. Further, the term "may" encompasses all the meanings of the term "can."

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, where the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," or the like, one or more other parts may be located between the two parts unless a more limiting term, such as "immediate(ly)," "direct(ly)," or "close(ly)," is used. For example, when a structure is described as being positioned "on," "upon," "on top of," "over," "under," "above," "below," "beneath," "near," "close to," "adjacent to," "beside," or "next to" another structure, this description should be construed as including a case in which the structures contact each other directly as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

In describing a temporal relationship, when the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It is understood that, although the terms "first," "second," and the like may be used herein to describe various elements (e.g., layers, films, regions, components, sections, or the like), these elements should not be limited by these terms.

These terms are used only to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element, and the like) are not limited by ordinal numbers or the names in front of the elements.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, or the like) is "connected," "coupled," "attached," or "adhered" to another element, the element can not only be directly connected, coupled, attached, or adhered to another element, but also be indirectly connected, coupled, attached, or adhered to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The terms such as a "line" or "direction" should not be interpreted only based on a geometrical relationship in which the respective lines or directions are parallel or perpendicular to each other, and may be meant as lines or directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or". That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various embodiments of the present disclosure may be partially or entirely coupled to or combined with each other, may be technically associated with each other, and may be variously operated, linked or driven together. The embodiments of the present disclosure may be implemented or carried out independently of each other or may be implemented or carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

FIG. 1 is a schematic plan view illustrating an example of a transparent display panel.

In one or more examples, an X axis may indicate a line parallel to a scan line, a Y axis may indicate a line parallel to a data line, and a Z axis may indicate a height direction of a transparent display device 100.

Although a description is provided based on a feature that the transparent display device 100 according to an example embodiment of the present disclosure is embodied as an organic light emitting display device, the transparent display device 100 may be embodied as a liquid crystal display device, a plasma display panel (PDP), a quantum dot light emitting display (QLED) or an electrophoresis display device.

Referring to FIG. 1, a transparent display device according to one or more example embodiments of the present disclosure may include a transparent display panel 110. The transparent display panel 110 may include a display area DA provided with pixels to display an image, and a non-display area NDA for not displaying an image.

The display area DA may be provided with a first signal lines SL1, a second signal lines SL2 and the pixels. The non-display area NDA may be provided with a pad area PA in which pads are disposed, and at least one gate driver 205.

The first signal lines SL1 may be extended in a first direction (e.g., Y-axis direction). The first signal lines SL1 may cross (or intersect) the second signal lines SL2 in the display area DA. The second signal lines SL2 may be extended in the display area DA in a second direction (e.g., X-axis direction). The pixel may be provided in an area where the first signal line SL1 is provided or an area where the first signal line SL1 and the second signal line SL2 cross each other, and the pixel may emit predetermined light to display an image.

The gate driver 205 may be connected to the scan lines and supply scan signals to the scan lines. The gate driver 205 may be disposed in the non-display area NDA at one side or both sides of the display area DA of the transparent display panel 110 using a gate driver in panel (GIP) method or a tape automated bonding (TAB) method.

The transparent display panel 110 may further include a touch line and a touch sensor in addition to the first signal line SL1, the second signal line SL2 and the pixel in order to implement a touch function. Further details about the touch line and the touch sensor are described with reference to FIGS. 2 to 9.

Figure 2:
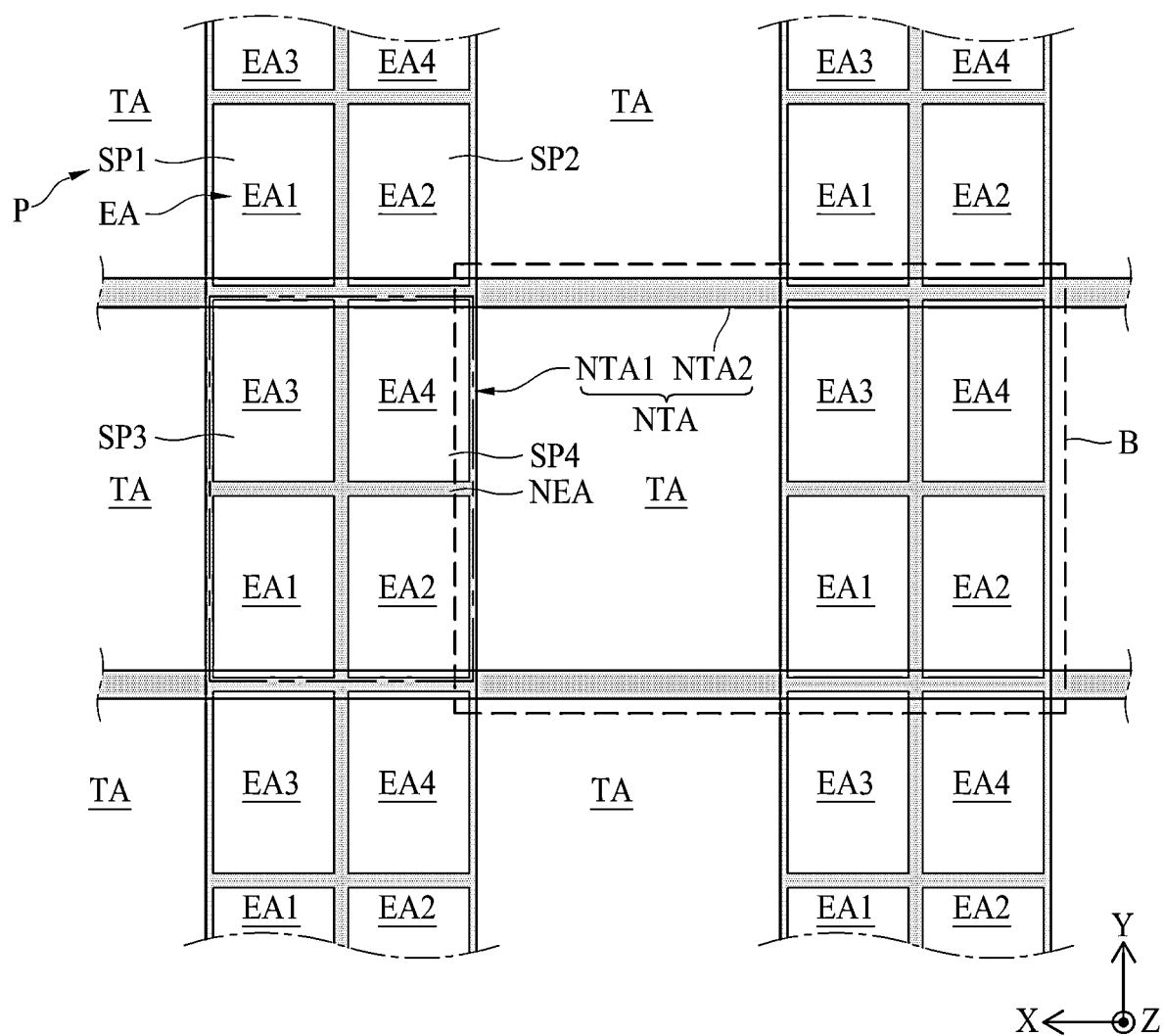
FIG. 2 is a schematic view illustrating an example of a pixel provided in an area A of FIG. 1.
Figure 3A:
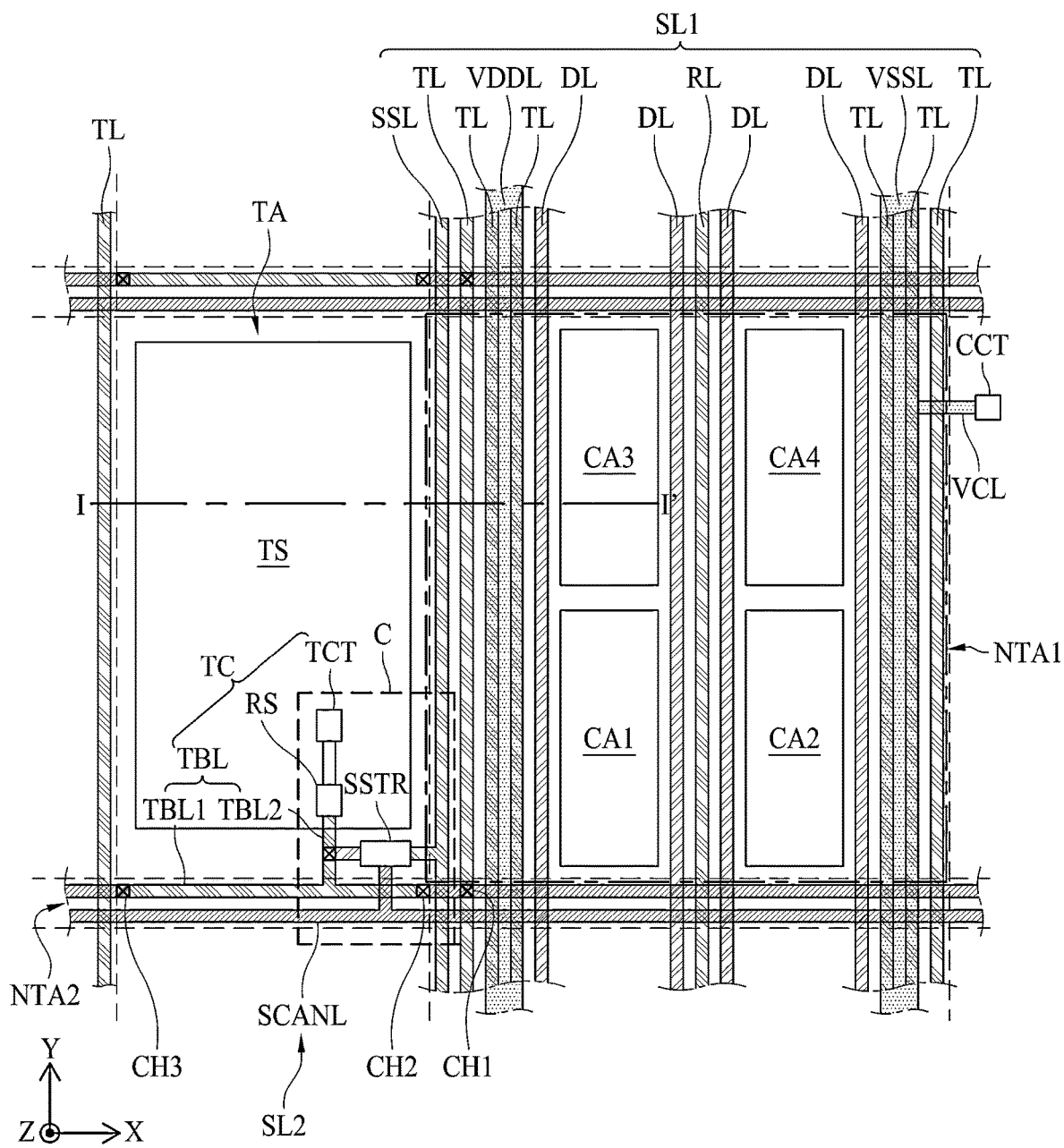
FIGS. 3A and 3B are views illustrating an example of signal lines, touch lines and a touch sensor, which are provided in an area B of FIG. 2.
Figure 3B:
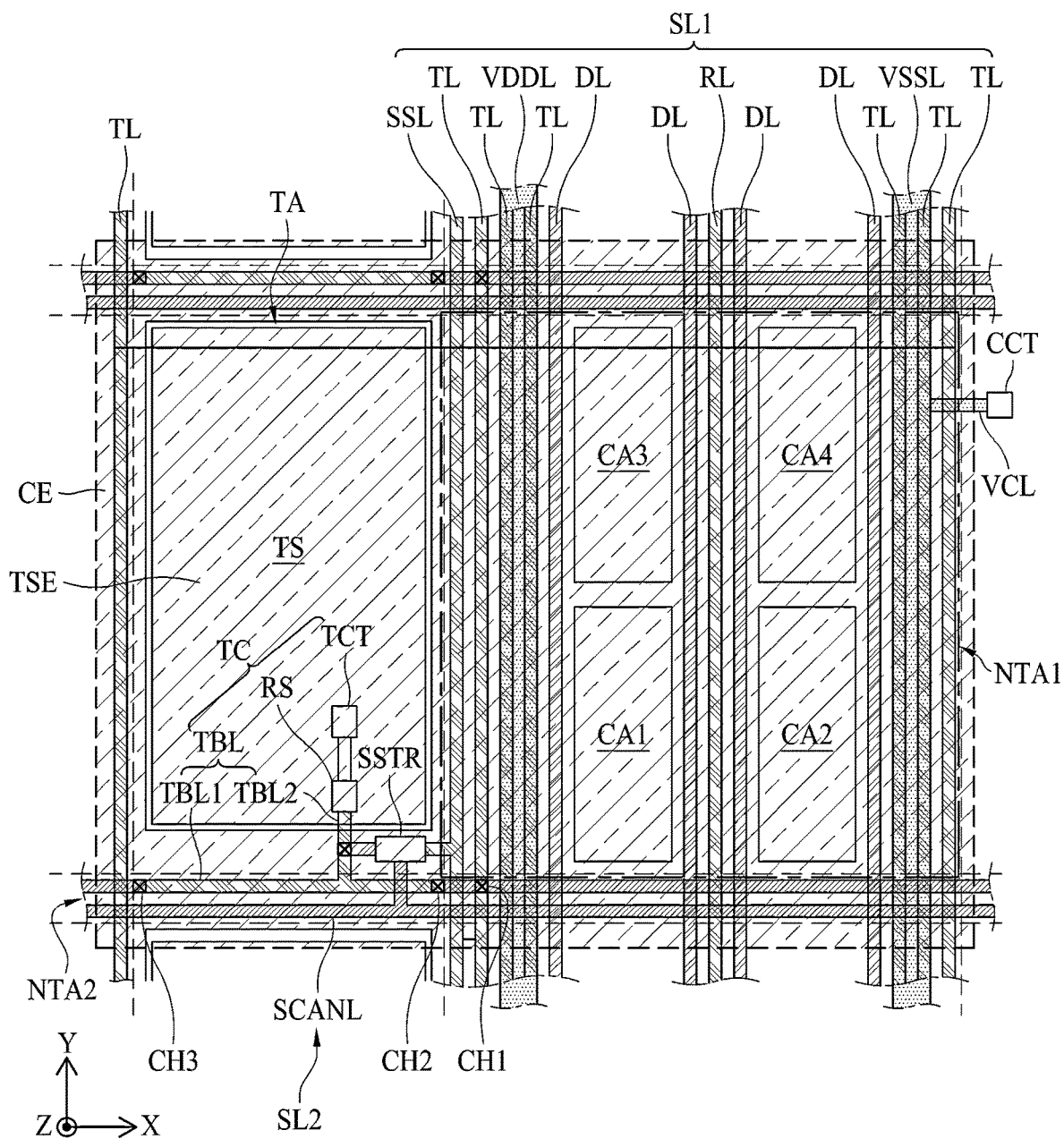

FIG. 2 is a schematic view illustrating an example of a pixel provided in an area A of FIG. 1, and FIGS. 3A and 3B are views illustrating an example of signal lines, touch lines and a touch sensor, which are provided in an area B of FIG. 2. FIGS. 3A and 3B are substantially the same, except that some of the elements or notations are shown in one of the figures but not in the other figure simply for clarity. For example, notations I-I' and C are illustrated in FIG. 3A but not shown in FIG. 3B simply for clarity, and elements CE and TSE are illustrated in FIG. 3B but not shown in FIG. 3A simply for clarity. The elements and notations not shown in one of FIGS. 3A and 3B are deemed present in the other figure of FIGS. 3A and 3B.

The display area DA, as shown in FIG. 2, may include a transmissive area TA and a non-transmissive area NTA. The transmissive area TA is an area through which most of externally incident light passes, and the non-transmissive area NTA is an area through which most of externally incident light fails to transmit (or pass). For example, the transmissive area TA may be an area where light transmittance is greater than $\alpha$ %, and the non-transmissive area NTA may be an area where light transmittance is less than $\beta$ %. In this example, $\alpha$ is greater than $\beta$. A user may be able to view an object or background arranged at a rear surface of the transparent display panel 110 due to the transmissive area TA.

The non-transmissive area NTA may include a first non-transmissive area NTA1, a second non-transmissive area NTA2 and a plurality of pixels P. Pixels P may be provided to at least partially overlap at least one of the first signal line SL1 and the second signal line SL2, thereby emitting predetermined light to display an image. A light emission area EA may correspond to an area, from which light is emitted, in the pixel P.

In one or more example embodiments, a transmissive area TA may refer to one or more transmissive areas TA. In one or more example embodiments, a first non-transmissive area NTA1 may refer to one or more first non-transmissive areas NTA1. In one or more example embodiments, a second non-transmissive area NTA2 may refer to one or more non-transmissive areas NTA2.

Each of the pixels P, as shown in FIG. 2, may include at least one of a first subpixel SP1, a second subpixel SP2, a third subpixel SP3 and a fourth subpixel SP4. The first subpixel SP1 may include a first light emission area EA1 emitting light of a first color. The second subpixel SP2 may include a second light emission area EA2 emitting light of a second color. The third subpixel SP3 may include a third light emission area EA3 emitting light of a third color. The fourth subpixel SP4 may include a fourth light emission area EA4 emitting light of a fourth color.

The first to fourth light emission areas EA1, EA2, EA3 and EA4 may emit light of different colors. For example, the first light emission area EA1 may emit light of a green color. The second light emission area EA2 may emit light of a red color. The third light emission area EA3 may emit light of a blue color. The fourth light emission area EA4 may emit light of a white color. However, the light emission areas are not limited to this example. Furthermore, the arrangement order of the subpixels SP1, SP2, SP3 and SP4 may be changed in various ways.

The first non-transmissive area NTA1 may be extended in a first direction (e.g., Y-axis direction) in a display area DA, and may be disposed to at least partially overlap light emission areas EA1, EA2, EA3 and EA4. A plurality of first non-transmissive areas NTA1 may be provided in the transparent display panel 110, and a transmissive area TA may be provided between two adjacent ones of the plurality of first non-transmissive areas NTA1. In one or more examples, each of the plurality of first non-transmissive areas NTA1 may partially (or substantially) include light emission areas EA1, EA2, EA3 and EA4, or may at least partially (or substantially) overlap light emission areas EA1, EA2, EA3 and EA4. In the first non-transmissive area NTA1, first signal lines SL1 extended in the first direction (e.g., Y-axis direction) may be disposed to be spaced apart from each other.

For example, the first signal lines SL1 may include at least one of a pixel power line VDDL, a common power line VSSL, a reference line RL and data lines DL.

The pixel power line VDDL may supply a first power source to a driving transistor DTR of each of subpixels SP1, SP2, SP3 and SP4 provided in the display area DA.

The common power line VSSL may supply a second power source to a cathode electrode of the subpixels SP1, SP2, SP3 and SP4 provided in the display area DA. In this example, the second power source may be a common power source commonly supplied to the subpixels SP1, SP2, SP3 and SP4.

The common power line VSSL may supply the second power source to the cathode electrode through a cathode contact electrode CCT. The cathode contact electrode CCT may be provided between the transmissive area TA and the common power line VSSL. A power connection line VCL may be disposed between the common power line VSSL and the cathode contact electrode CCT. One end of the power connection line VCL may be connected to the common power line VSSL and the other end thereof may be connected to the cathode contact electrode CCT. The cathode electrode may be connected to the cathode contact electrode CCT. As a result, the cathode electrode may be electrically connected to the common power line VSSL through the power connection line VCL and the cathode contact electrode CCT.

The reference line RL may supply an initialization voltage (or sensing voltage) to the driving transistor DTR of each of the subpixels SP1, SP2, SP3 and SP4 provided in the display area DA. The reference line RL may be disposed between the plurality of data lines DL. For example, the reference line RL may be disposed at the center of the four data lines DL, that is, between the second data line DL and the third data line DL.

The reference line RL may be diverged and connected to the plurality of subpixels SP1, SP2, SP3 and SP4. In detail, the reference line RL may be connected to circuit elements of the plurality of subpixels SP1, SP2, SP3 and SP4 to supply an initialization voltage (or sensing voltage) to each of the subpixels SP1, SP2, SP3 and SP4.

Each of the data lines DL may supply a data voltage to the subpixels SP1, SP2, SP3 and SP4. For example, one data line DL may supply a first data voltage to a first driving transistor of the first subpixel SP1, the other data line DL may supply a second data voltage to a second driving transistor of the second subpixel SP2. Another data line DL may supply a third data voltage to a third driving transistor of the third subpixel SP3, and another data line DL may supply a fourth data voltage to a fourth driving transistor of the fourth subpixel SP4.

The first signal lines SL1 may further include touch lines TL and sensing lines SSL.

In the transparent display panel 110 according to one or more example embodiments of the present disclosure, the touch line TL may be further disposed in the first non-transmissive area NTA1. At least two touch lines TL may be provided in the first non-transmissive area NTA1. When the plurality of touch lines TL are disposed in the transmissive area TA of the transparent display panel 110, light transmittance may be deteriorated due to the plurality of touch lines TL.

In addition, a slit (specifically, for example, in an elongated linear or rectangular shape) may be provided between the plurality of touch lines TL. When external light passes through the slit, a diffraction phenomenon may occur. According to the diffraction phenomenon, light corresponding to plane waves may be changed to spherical waves as the light passes through the slit, and an interference phenomenon may occur in the spherical waves. Therefore, constructive interference and destructive interference occur in the spherical waves, whereby the external light that has passed through the slit may have irregular light intensity. As a result, in the transparent display panel 110, definition of an object or image positioned at an opposite side may be reduced. For at least this reason, there are some technical benefits to dispose the plurality of touch lines TL in the first non-transmissive area NTA1 rather than in the transmissive area TA.

In FIGS. 3A and 3B, a first non-transmissive area NTA1 may partially include, or at least partially overlap, first signal lines SL1. The first signal lines SL1 may include a plurality of touch lines TL, and thus, the plurality of touch lines TL may be disposed between first signal lines SL1 in the first non-transmissive area NTA1 as shown in FIGS. 3A and 3B. For example, four touch lines TL may be disposed in one first non-transmissive area NTA1. Two touch lines TL may be disposed between the circuit areas CA1, CA2, CA3 and CA4 and the transmissive area TA disposed on the right of the circuit areas CA1, CA2, CA3 and CA4. The other two touch lines TL may be disposed between the circuit areas CA1, CA2, CA3 and CA4 and the transmissive area TA disposed on the left of the circuit areas CA1, CA2, CA3 and CA4, but the present disclosure is not limited to this arrangement. The plurality of touch lines TL are required so as not to overlap circuit areas CA1, CA2, CA3 and CA4 in which circuit elements are disposed, and various modifications may be made in the arrangement of the plurality of touch lines TL with respect to the first signal lines SL1.

In a transparent display panel 110 according to one or more example embodiments of the present disclosure, a sensing line SSL may be further disposed in the first non-transmissive area NTA1. The sensing line SSL is intended to detect whether short-circuit occurs between a cathode electrode of a light emitting element and a touch sensor electrode of a touch sensor TS. The sensing line SSL may sense a voltage applied to the touch sensor electrode of the plurality of touch sensors TS through a sensing transistor SSTR.

The sensing line SSL may be disposed to be adjacent to the transmissive area TA in the first non-transmissive area NTA1. In detail, the sensing line SSL may be disposed between the plurality of touch lines TL and the transmissive area TA.

The transparent display panel 110 according to one or more example embodiments of the present disclosure is provided with a pixel P between adjacent transmissive areas TA. The pixel P may include light emission areas EA1, EA2, EA3 and EA4 in which a light emitting element is disposed to emit light. Since the non-transmissive area NTA in the transparent display panel 110 has a small area, a circuit element may be disposed to at least partially overlap the light emission areas EA1, EA2, EA3 and EA4.

In the transparent display panel 110 according to one or more example embodiments of the present disclosure, the plurality of touch lines TL do not overlap the circuit areas CA1, CA2, CA3 and CA4, whereby parasitic capacitance of the touch lines TL due to the circuit elements may be reduced or minimized. Furthermore, the transparent display panel 110 according to one or more example embodiments of the present disclosure may reduce a horizontal distance difference between the touch lines TL and improve uniformity of the parasitic capacitance.

The second non-transmissive area NTA2 may be extended in the display area DA in a second direction (e.g., X-axis direction), and may be disposed to at least partially overlap the light emission areas EA1, EA2, EA3 and EA4. A plurality of second non-transmissive areas NTA2 may be provided in the transparent display panel 110, and the transmissive area TA (or each of one or more transmissive areas TA) may be provided between two adjacent second non-transmissive areas NTA2. The second signal line SL2 may be disposed in the second non-transmissive area NTA2.

The second signal line SL2 may be extended in a second direction (e.g., X-axis direction), and may include, for example, a scan line SCANL. The scan line SCANL may supply a scan signal to subpixels SP1, SP2, SP3 and SP4 of the pixel P, or may supply the scan signal to the sensing transistor SSTR.

The second signal line SL2 may further include a touch bridge line TBL. The touch bridge line TBL may connect any one of the plurality of touch lines TL with a touch sensor TS. The touch bridge line TBL may be connected to any one of the plurality of touch lines TL through a first contact hole CH1. The touch bridge line TBL may be connected to at least two touch sensors TS arranged in the second direction (e.g., X-axis direction) while being extended in the second direction (e.g., X-axis direction).

In the transparent display panel 110 according to one or more example embodiments of the present disclosure, the plurality of touch lines TL may be disposed in the first non-transmissive area NTA1 that is not the second non-transmissive area NTA2, whereby light transmittance may be prevented from being deteriorated due to the plurality of touch lines TL. The second non-transmissive area NTA2 extended in the second direction (e.g., X-axis direction) crosses between adjacent transmissive areas TA as shown in FIGS. 3A and 3B. When a width of the second non-transmissive area NTA2 crossing the transmissive areas TA is increased, a size of the transmissive area TA is necessarily reduced.

When the plurality of touch lines TL are disposed in the second non-transmissive area NTA2, the width of the second non-transmissive area NTA2 is increased to dispose a large number of lines, and the size of the transmissive area TA is reduced. That is, a problem may occur in that light transmittance of the transparent display panel 110 is reduced due to the plurality of touch lines TL.

In the transparent display panel 110 according to one or more example embodiments of the present disclosure, the plurality of touch lines TL are disposed in the first non-transmissive area NTA1, and only one touch bridge line TBL for connecting the plurality of touch sensors TS are provided in the second non-transmissive area NTA2. Therefore, the transparent display panel 110 according to one or more example embodiments of the present disclosure may reduce or minimize the size decrease of the transmissive area TA or the decrease in light transmittance due to the plurality of touch lines TL and the touch bridge line TBL.

The touch sensor TS may be provided in the transmissive area TA. The touch sensor TS may be disposed in each of the plurality of transmissive areas TA, and may be changed in capacitance during user contact. A touch driver (not shown) may be connected to the plurality of touch sensors TS through the plurality of touch lines TL to detect a change in capacitance of the plurality of touch sensors TS. The plurality of touch sensors TS may correspond to the plurality of pixels P on a one-to-one basis.

A connection relation among a plurality of touch sensors TS, a plurality of touch lines TL and a plurality of touch bridge lines TBL is described in more detail with reference to FIGS. 4 and 5.

Figure 4:
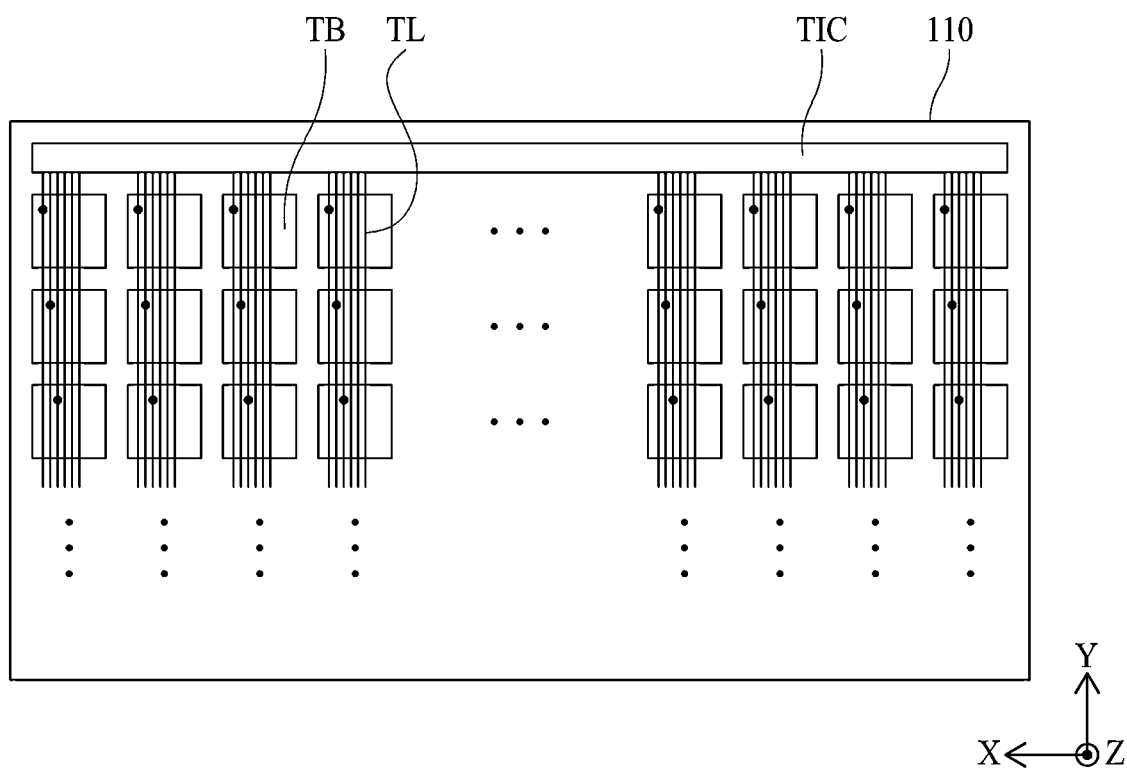
FIG. 4 is a view illustrating an example of a connection relation between a plurality of touch blocks and a plurality of touch lines.
Figure 5:
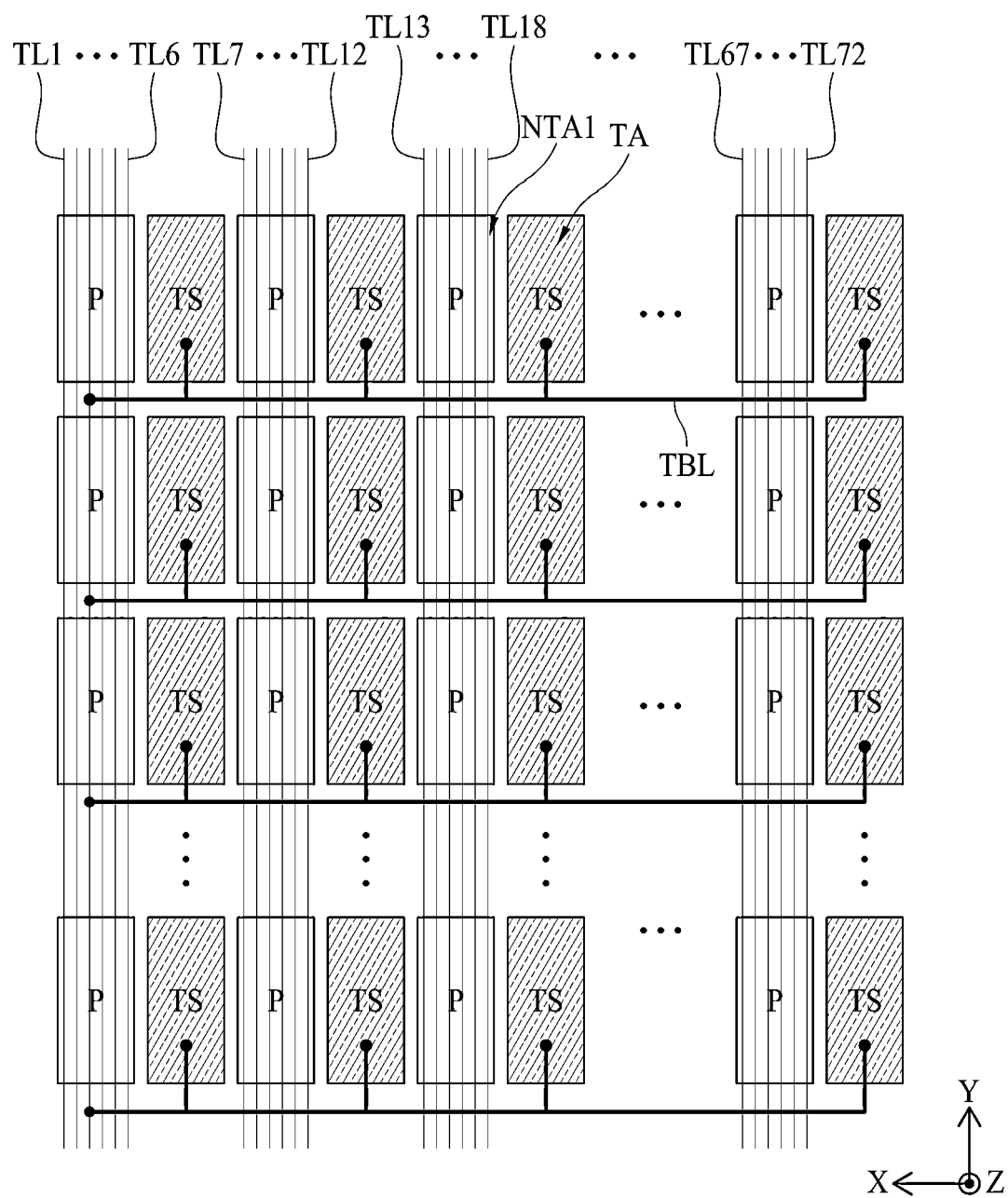
FIG. 5 is a view illustrating an example of a connection relation between a plurality of touch lines and a plurality of touch sensors in one touch block.

FIG. 4 is a view illustrating an example of a connection relation between a plurality of touch blocks and a plurality of touch lines, and FIG. 5 is a view illustrating an example of a connection relation between a plurality of touch lines and a plurality of touch sensors in one touch block.

Referring to FIGS. 4 and 5, the transparent display panel 110 according to one or more example embodiments of the present disclosure may include a plurality of touch blocks TB. Each of the plurality of touch blocks TB is a basic unit for determining a user touch position, and may include a plurality of pixels P and a plurality of touch sensors TS. A plurality of touch sensors TS may be provided in each of a plurality of transmissive areas TA, and may be disposed to correspond to the plurality of pixels P in one-to-one correspondence. For example, each of the plurality of touch blocks TB may include 12×15 pixels P and 12×15 touch sensors TS. In this case, when image resolution is 1920× 1080, touch resolution may be 160×72.

In the transparent display panel 110 according to one or more example embodiments of the present disclosure, each of the plurality of touch lines TL may be connected to only one of the plurality of touch blocks TB to sense a change in capacitance of the touch sensors TS provided in the connected touch block TB. That is, the plurality of touch lines TL provided in the transparent display panel 110 may correspond to the plurality of touch blocks TB in one-to-one correspondence. Therefore, the number of touch lines TL equivalent to the number of touch blocks TB may be disposed in the transparent display panel 110. For example, when the number of touch blocks TB is 160×72, the touch lines TL may be also disposed to be 160×72, and thus may be connected to a touch driver TIC.

As described above, in order to form the number of touch lines TL as many as the number of touch blocks TB, at least two touch lines TL should be formed in one first non-transmissive area NTA1. For example, when image resolution is 1920×1080 and touch resolution is 160×72, six touch lines TL may be provided in one first non-transmissive area NTA1 as shown in FIGS. 3A and 3B in order to form 160×72 touch lines TL in the transparent display panel 110.

Meanwhile, the plurality of touch sensors TS provided in one touch block TB may be connected to one of the plurality of touch lines TL provided in one touch block TB as shown in FIG. 5. For example, twelve first non-transmissive areas NTA1 may be provided in one touch block TB, and six touch lines TL may be disposed in each of the twelve first non-transmissive areas NTA1. As a result, 72 touch lines TL1, . . . , TL72 may be provided in one touch block TB. In this case, the plurality of touch sensors TS provided in one touch block TB may be connected to one of 72 touch lines TL1, . . . , TL72. In this case, the plurality of touch sensors TS provided in one touch block TB may be connected to one specific touch line TL of 72 touch lines TL1, . . . , TL72. In this example, the specific touch line TL may be connected to the plurality of touch sensors TS arranged in a second direction (e.g., X-axis direction) through touch bridge lines TBL extended in the second direction (e.g., X-axis direction). As a result, the plurality of touch sensors TS provided in one touch block TB may be electrically connected to each other through the specific touch line TL and the plurality of touch bridge lines TBL.

The plurality of touch lines TL may correspond to the touch blocks TB in one-to-one correspondence. Therefore, the plurality of touch blocks TB are connected to different touch lines and thus may be electrically separated from each other. Each touch line TL may connect the plurality of touch sensors TS provided in the corresponding touch block TB to the touch driver TIC. In detail, each touch line TL may transfer a changed capacitance provided from the touch sensors TS provided in the touch block TB to the touch driver TIC. The touch driver TIC may sense a change in capacitance and determine a touch position of a user. In addition, each touch line TL may provide a sensing voltage generated from the touch driver TIC to the touch sensors TS provided in the touch block TB.

The light emitting elements of the light emission area EA and the touch sensors TS of the transmissive area TA are described in more detail with reference to FIG. 6.

Figure 6:
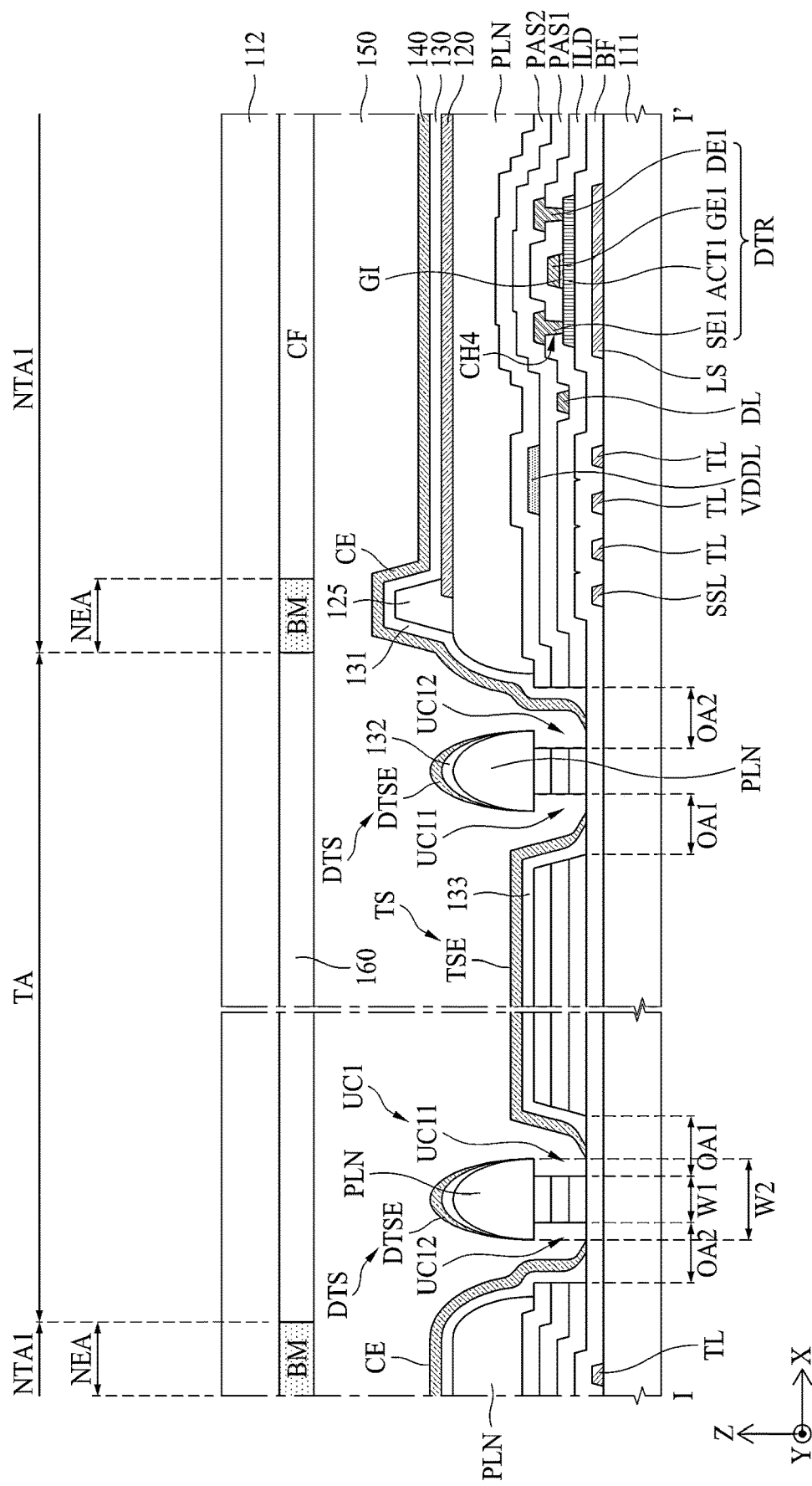
FIG. 6 is an example of a cross-sectional view taken along a line I-I' of FIG. 3A.

FIG. 6 is an example of a cross-sectional view taken along a line I-I' of FIG. 3A.

Referring to FIGS. 3A, 3B and 6, the transparent display panel 110 according to one or more example embodiments of the present disclosure may include a transmissive area TA (which may include a plurality of transmissive areas TA) and a non-transmissive area NTA. In one or more examples, the transparent display panel 110 may include a first substrate 111. In one or more examples, the transparent display panel 110 (or the first substrate 111) may include (or may be provided with) a transmissive area TA and a non-transmissive area NTA. The transmissive area TA may include a plurality of transmissive areas TA. The non-transmissive area NTA may include a plurality of light emission areas EA disposed between adjacent transmissive areas TA. The non-transmissive area NTA may include a first non-transmissive area NTA1 extended in a first direction (e.g., Y-axis direction) and a second non-transmissive area NTA2 extended in the second direction (e.g., X-axis direction).

The first non-transmissive area NTA1 may include circuit areas CA1, CA2, CA3 and CA4 in which at least one transistor and a capacitor are disposed. In addition, the first non-transmissive area NTA1 may be extended in the first direction (e.g., Y-axis direction), and may include a pixel power line VDDL, a common power line VSSL, a reference line RL, data lines DL, touch lines TL and a sensing line SSL, which are disposed so as not to overlap the circuit areas CA1, CA2, CA3 and CA4. The second non-transmissive area NTA2 may include a scan line SCANL and a touch bridge line TBL, which are extended in the second direction (e.g., X-axis direction).

At least one transistor may include a driving transistor DTR and switching transistors. The switching transistor may be switched in accordance with a scan signal supplied to a scan line SCANL to charge a data voltage supplied from the data line DL in the capacitor.

The driving transistor DTR may be switched in accordance with the data voltage charged in the capacitor to generate a data current from a power source supplied from the pixel power line VDDL and supply the data current to a first electrode layer 120 of subpixels SP1, SP2, SP3 and SP4. The driving transistor DTR may include an active layer ACT1, a gate electrode GE1, a source electrode SE1 and a drain electrode DE1.

In detail, as shown in FIG. 6, a light-shielding layer LS may be provided over the first substrate 111. The light-shielding layer LS may serve to shield external light incident on the active layer ACT1 in an area where the driving transistor DTR is formed. The light-shielding layer LS may include a single layer or multi-layer made of any one or more of molybdenum (Mo), aluminum (Al), chromium (Cr), gold (Au), titanium (Ti), nickel (Ni), neodymium (Nd) and copper (Cu) or their alloy.

In the transparent display panel 110 according to one or more example embodiments of the present disclosure, at least a portion of the pixel power line VDDL, the common power line VSSL, the reference line RL, the data lines DL, the touch lines TL, the touch bridge line TBL and the sensing line SSL may be formed on the same layer as the light-shielding layer LS. For example, the reference line RL, the touch lines TL, the touch bridge line TBL and the sensing line SSL may be formed of the same material as that of the light-shielding layer LS on the same layer as the light-shielding layer LS, but the present disclosure is not limited thereto.

A buffer layer BF may be provided over the light-shielding layer LS. The buffer layer BF is intended to protect the driving transistor DTR from moisture permeated through the first substrate 111 vulnerable to moisture permeation, and may include an inorganic layer, for example, a silicon oxide layer (SiOx), a silicon nitride layer (SiNx) or their multi-layer.

The active layer ACT1 of the driving transistor DTR may be provided over the buffer layer BF. The active layer ACT1 may include a silicon-based semiconductor material or an oxide-based semiconductor material.

A gate insulating layer GI may be provided over the active layer ACT1 of the driving transistor DTR. The gate insulating layer GI may be patterned only in an area where the gate electrode GE1 is disposed. The gate insulating layer GI may include an inorganic layer, for example, a silicon oxide layer (SiOx), a silicon nitride layer (SiNx) or their multi-layer.

The gate electrode GE1 of the driving transistor DTR may be provided over the gate insulating layer GI. The gate electrode GE1 may include a single layer or multi-layer made of any one or more of molybdenum (Mo), aluminum (Al), chromium (Cr), gold (Au), titanium (Ti), nickel (Ni), neodymium (Nd) and copper (Cu) or their alloy.

An interlayer insulating layer ILD may be provided over the gate electrode GE1 of the driving transistor DTR. The interlayer insulating layer ILD may be provided in the non-transmissive area NTA and the transmissive area TA. However, in order to form a first undercut structure UC1 in the transmissive area TA, the interlayer insulating layer ILD may be provided with an opening area, which exposes the buffer layer BF, without being provided in at least a portion of the transmissive area TA. For example, the interlayer insulating layer ILD is not provided in at least a portion of the transmissive area TA (e.g., in the opening area).

As an example, one or a plurality of first undercut structures UC1 may be provided. The interlayer insulating layer ILD may include one opening area OA1 to form one undercut UC11 by using the first undercut structure UC1. Alternatively, the interlayer insulating layer ILD may include two or more opening areas OA1 and OA2 to form at least two or more undercuts UC11 and UC12 by using the first undercut structure UC1.

In the following description, for convenience of description, as shown in FIG. 6, the interlayer insulating layer ILD may include a first opening area OA1 and a second opening area OA2 to form two undercuts UC11 and UC12, but the present disclosure is not limited thereto.

The interlayer insulating layer ILD may include an inorganic layer, for example, a silicon oxide layer (SiOx), a silicon nitride layer (SiNx) or their multi-layer.

The source electrode SE1 and the drain electrode DE1 of the driving transistor DTR may be disposed over the interlayer insulating layer ILD. The source electrode SE1 and the drain electrode DE1 of the driving transistor DTR may be connected to the active layer ACT1 of the driving transistor DTR through a fourth contact hole CH4 passing through the interlayer insulating layer ILD. The source electrode SE1 and the drain electrode DE1 may include a single layer or multi-layer made of any one or more of molybdenum (Mo), aluminum (Al), chromium (Cr), gold (Au), titanium (Ti), nickel (Ni), neodymium (Nd) and copper (Cu) or their alloy.

In the transparent display panel 110 according to one or more example embodiments of the present disclosure, at least a portion of the pixel power line VDDL, the common power line VSSL, the reference line RL, the data lines DL, the touch lines TL, the touch bridge line TBL and the sensing line SSL may be provided on the same layer as the source electrode SE1 and the drain electrode DE1 of the driving transistor DTR. For example, the data lines DL may include the same material on the same layer as the source electrode SE1 and the drain electrode DE1, but the present disclosure is not limited thereto.

A first passivation layer PAS1 for insulating the driving transistor DTR may be provided over the source electrode SE1 and the drain electrode DE1 of the driving transistor DTR. The first passivation layer PAS1 may be provided in the non-transmissive area NTA and the transmissive area TA. However, in order to form the first undercut structure UC1 in the transmissive area TA, the first passivation layer PAS1 may be provided with an opening area, which exposes the buffer layer BF, without being provided in at least a portion of the transmissive area TA. For example, the first passivation layer PAS1 is not provided in at least a portion of the transmissive area TA (e.g., in the opening area).

In detail, the first passivation layer PAS1 may be provided with a first opening area OA1 and a second opening area OA2, which expose the buffer layer BF, so that the first passivation layer PAS1 is not provided in at least a portion of the transmissive area TA, in order to form two undercuts UC11 and UC12 by using the first undercut structure UC1 in the transmissive area TA. The first opening area OA1 of the first passivation layer PAS1 may at least partially overlap the first opening area OA1 of the interlayer insulating layer ILD, and the second opening area OA2 of the first passivation layer PAS1 may at least partially overlap the second opening area OA2 of the interlayer insulating layer ILD.

The first passivation layer PAS1 may include an inorganic layer, for example, a silicon oxide layer (SiOx), a silicon nitride layer (SiNx) or their multi-layer.

A clad layer may be provided over the first passivation film PAS1. At least a portion of the pixel power line VDDL, the common power line VSSL, the reference line RL, the data lines DL, the touch lines TL, the touch bridge line TBL and the sensing line SSL may be provided on the same layer as the clad layer. For example, the pixel power line VDDL and the common power line VSSL may be provided over the first passivation layer PAS1.

The clad layer may include a single layer or multi-layer made of any one or more of molybdenum (Mo), aluminum (Al), chromium (Cr), gold (Au), titanium (Ti), nickel (Ni), neodymium (Nd) and copper (Cu) or their alloy. For example, the clad layer may be formed of an alloy of molybdenum (Mo) and titanium (Ti) or a stacked structure of an alloy of molybdenum (Mo), titanium (Ti) and indium tin oxide (ITO).

A second passivation layer PAS2 may be provided over the clad layer. The second passivation layer PAS2 may be provided in the non-transmissive area NTA and the transmissive area TA. However, in order to form the first undercut structure UC1 in the transmissive area TA, the second passivation layer PAS2 may be provided with an opening area, which exposes the buffer layer BF, without being provided in at least a portion of the transmissive area TA. For example, the second passivation layer PAS2 is not provided in at least a portion of the transmissive area TA (e.g., in the opening area).

In detail, the second passivation layer PAS2 may be provided with a first opening area OA1 and a second opening area OA2, which expose the buffer layer BF, without being provided in at least a portion of the transmissive area TA, in order to form two undercuts UC11 and UC12 by using the first undercut structure UC1 in the transmissive area TA. The first opening area OA1 of the second passivation layer PAS2 may at least partially overlap the first opening area OA1 of the first passivation layer PAS1 and the first opening area OA1 of the interlayer insulating layer ILD, and the second opening area OA2 of the second passivation layer PAS2 may at least partially overlap the second opening area OA2 of the first passivation layer PAS1 and the second opening area OA2 of the interlayer insulating layer ILD.

The second passivation layer PAS2 may include an inorganic layer, for example, a silicon oxide layer (SiOx), a silicon nitride layer (SiNx) or their multi-layer.

A planarization layer PLN for planarizing a step difference due to the driving transistor DTR and a plurality of signal lines may be provided over the second passivation layer PAS2. The planarization layer PLN may be provided in the non-transmissive area NTA, and may not be provided in at least a portion of the transmissive area TA. The planarization layer PLN may suppress transparency by inducing refraction or the like of light while transmitting light. Therefore, the transparent display panel 110 according to one or more example embodiments of the present disclosure may increase transparency by removing a portion of the planarization layer PLN in the transmissive area TA. The planarization layer PLN may be provided in a pattern shape in at least a portion of the transmissive area TA in order to form the first undercut structure UC1 in the transmissive area TA.

The planarization layer PLN may include an organic layer such as acryl resin, epoxy resin, phenolic resin, polyamide resin, polyimide resin or the like.

In the transparent display panel 110 according to one or more example embodiments of the present disclosure, the first undercut structure UC1 may be formed using the planarization layer PLN and a plurality of inorganic insulating layers, for example, the first and second passivation layers PAS1 and PAS2 and the interlayer insulating layer ILD.

In detail, the first undercut structure UC1 may include a plurality of inorganic insulating patterns having a first width W1 and an organic insulating pattern having a second width W2. In this example, each of the plurality inorganic insulating patterns may be a pattern formed of the same material on the same layer as each of the first and second passivation layers PAS1 and PAS2 and the interlayer insulating layer ILD, and the organic insulating pattern may be a pattern formed of the same material on the same layer as the planarization layer PLN.

The first undercut structure UC1 may be formed so that the organic insulating pattern has the second width W2 greater than the first width W1 of the plurality of inorganic insulating patterns. The first undercut structure UC1 may form a first undercut UC11 in which the organic insulating pattern protrudes more than the plurality of inorganic insulating patterns in a direction of the touch sensor TS in the first opening area OA1. Therefore, the first undercut structure UC1 may expose at least a portion of a lower surface of the planarization layer PLN in the first opening area OA1, and may form a space from the buffer layer BF without being provided with the plurality of inorganic layers below the exposed lower surface. Thus, according to one or more example embodiments, in the first opening area OA1, the plurality of inorganic layers are not provided below the exposed lower surface of the planarization layer PLN. For example, in the first opening area OA1, the plurality of inorganic layers are not provided between the exposed lower surface and an upper surface of the buffer layer BF.

In addition, the first undercut structure UC1 may form a second undercut UC12 in which the organic insulating pattern protrudes more than the plurality of inorganic insulating patterns in a direction of the plurality of inorganic insulating patterns in the second opening area OA2. Therefore, the first undercut structure UC1 may expose at least a portion of the lower surface of the planarization layer PLN in the second opening area OA2, and may form a space from the buffer layer BF without being provided with the plurality of inorganic layers below the exposed lower surface.

The first undercut structure UC1 may be provided in the transmissive area TA. In more detail, the first undercut structure UC1 may be provided between the touch sensor TS and the non-transmissive area NTA. In addition, the first undercut structure UC1 may have a closed shape on a plane. As an example, the first undercut structure UC1 may be formed along an edge area of the transmissive area TA. In this case, the first undercut structure UC1 may be formed to surround the touch sensor TS.

In the transparent display panel 110 according to one or more example embodiments of the present disclosure, the first undercut structure UC1 may be formed using the plurality of inorganic insulating layers so that light transmittance may be prevented from being reduced due to the first undercut structure UC1.

The first electrode layer 120, an organic light emitting layer 130, a second electrode layer 140 and a bank 125 may be provided on the planarization layer PLN.

The first electrode layer 120 may be provided for each of the subpixel SP1, SP2, SP3 and SP4 on the planarization layer PLN. The first electrode layer 120 is not provided in the transmissive area TA. The first electrode layer 120 may be connected to the driving transistor DTR. In detail, the first electrode layer 120 may be connected to one of the source electrode SE1 and the drain electrode DE1 of the driving transistor DTR through a contact hole (not shown) passing through the planarization layer PLN and the first and second passivation layers PAS1 and PAS2.

The first electrode layer 120 may include a metal material having high reflectance such as a stacked structure (Ti/Al/Ti) of aluminum and titanium, a stacked structure (ITO/Al/ITO) of aluminum and ITO, Ag alloy, a stacked structure (ITO/Ag alloy/ITO) of Ag alloy and ITO, MoTi alloy, and a stacked structure (ITO/MoTi alloy/ITO) of MoTi alloy and ITO. The Ag alloy may be an alloy of silver (Ag), palladium (Pd) and copper (Cu). The MoTi alloy may be an alloy of molybdenum (Mo) and titanium (Ti). The first electrode layer 120 may be an anode electrode of a light emitting element.

The bank 125 may be provided over the planarization layer PLN. In addition, the bank 125 may be formed to at least partially cover an edge of the first electrode layer 120 and expose a portion of the first electrode layer 120. Therefore, the bank 125 may prevent emission efficiency from being deteriorated due to concentration of a current on an end of the first electrode layer 120.

The bank 125 may define light emission areas EA1, EA2, EA3 and EA4 of the subpixels SP1, SP2, SP3 and SP4. The light emission areas EA1, EA2, EA3 and EA4 of the subpixels SP1, SP2, SP3 and SP4 represent areas in which the first electrode layer 120, the organic light emitting layer 130 and a cathode electrode CE are sequentially stacked so that holes from the first electrode layer 120 and electrons from the cathode electrode CE are combined with each other in the organic light emitting layer 130 to emit light. In this case, the area in which the bank 125 is formed may become a non-light emission area NEA because light is not emitted therefrom, and the area in which the bank 125 is not formed and the first electrode layer 120 is exposed may become the light emission area EA. The bank 125 may be formed of an organic layer such as acryl resin, epoxy resin, phenolic resin, polyamide resin, and/or polyimide resin.

The organic light emitting layer 130 may be provided over the first electrode layer 120. The organic light emitting layer 130 may include a hole transporting layer, a light emitting layer and an electron transporting layer. In this case, when a voltage is applied to the first electrode layer 120 and the cathode electrode CE, holes and electrons move to the light emitting layer through the hole transporting layer and the electron transporting layer, respectively, and are combined with each other in the light emitting layer to emit light.

In one example embodiment, the organic light emitting layer 130 may be a common layer commonly formed in the subpixels SP1, SP2, SP3 and SP4. In this case, the light emitting layer may be a white light emitting layer for emitting white light. In another example embodiment, the light emitting layer of the organic light emitting layer 130 may be formed for each of the subpixels SP1, SP2, SP3 and SP4. For example, a green light emitting layer for emitting green light may be formed in the first subpixel SP1, a red light emitting layer for emitting red light may be formed in the second subpixel SP2, a blue light emitting layer for emitting blue light may be formed in the third subpixel SP3, and a white light emitting layer for emitting white light may be formed in the fourth subpixel SP4. In this case, the light emitting layer of the organic light emitting layer 130 is not formed in the transmissive area TA.

The organic light emitting layer 130 may be separated without being continuous between the non-transmissive area NTA and the transmissive area TA by the first undercut structure UC1. In detail, the organic light emitting layer 130 may be divided into an organic light emitting layer 131 provided in the non-transmissive area NTA, an organic light emitting layer 132 provided at or on the first undercut structure UC1, and an organic light emitting layer 133 provided in the transmissive area TA by the first undercut structure UC1. That is, the organic light emitting layer 131 of the organic light emitting layer 130, which is provided in the non-transmissive area NTA, and the organic light emitting layer 133 of the organic light emitting layer 130, which is provided in the transmissive area TA, may be spaced apart from each other by the first undercut structure UC1.

The second electrode layer 140 may be provided over the organic light emitting layer 130 and the bank 125. When the second electrode layer 140 is deposited on the entire surface, the second electrode layer 140 may be separated without being continuous between the non-transmissive area NTA and the transmissive area TA by the first undercut structure UC1. In detail, the second electrode layer 140 may be divided into a second electrode CE provided in the non-transmissive area NTA, a second electrode DTSE provided at or on the first undercut structure UC1, and a second electrode TSE provided in the transmissive area TA by the first undercut structure UC1.

The second electrode CE (which may be referred to as a "cathode electrode") provided in the non-transmissive area NTA may be a cathode electrode, and may be an element constituting the light emitting element. The cathode electrode CE may be connected to a cathode contact electrode CCT to receive a power source from the common power line VSSL. The cathode electrode CE may be a common layer that is commonly formed in the subpixels SP1, SP2, SP3 and SP4 to apply the same voltage to the subpixels.

The second electrode TSE (which may be referred to as a "touch sensor electrode") provided in the transmissive area TA may be a touch sensor electrode TSE, and may be an element constituting the touch sensor TS. The touch sensor electrode TSE may be connected to a touch contact electrode TCT to provide a change in capacitance to the touch line TL.

Meanwhile, the second electrode DTSE (which may be referred to as a "dummy touch sensor electrode") provided at or on the first undercut structure UC1 may be a dummy touch sensor electrode, and may be an element constituting a dummy touch sensor DTS. The dummy touch sensor electrode DTSE is not connected to the touch sensor TS, and does not perform a function as a touch sensor TS. The dummy touch sensor electrode DTSE is provided between the touch sensor TS and the light emitting element so that the touch sensor electrode TSE of the touch sensor TS and the cathode electrode CE of the light emitting element may be more certainly (e.g., clearly and distinctly) separated from each other.

The second electrode layer 140, which includes the cathode electrode CE, the dummy touch sensor electrode DTSE and the touch sensor electrode TSE, may be formed of a transparent conductive material (TCO) such as ITO and/or indium zinc oxide (IZO), which may transmit light, or a semi-transmissive conductive material such as magnesium (Mg), silver (Ag) and/or an alloy of magnesium (Mg) and silver (Ag). When the second electrode layer 140 is formed of a semi-transmissive conductive material, light emitting efficiency may be increased by a micro cavity.

An encapsulation layer 150 may be provided over the light emitting elements and the touch sensors TS. The encapsulation layer 150 may be formed to at least partially cover the cathode electrode CE and the touch sensor electrode TSE, or may be formed on the cathode electrode CE and the touch sensor electrode TSE. The encapsulation layer 150 serves to prevent oxygen or moisture from being permeated into the organic light emitting layer 130, the cathode electrode CE and the touch sensor electrode TSE. Accordingly, in some example embodiments, the encapsulation layer 150 may include at least one inorganic film and at least one organic film.

A color filter CF may be provided over the encapsulation layer 150. The color filter CF may be provided on one surface of a second substrate 112, which faces the first substrate 111. In this case, the first substrate 111 provided with the encapsulation layer 150 and the second substrate 112 provided with the color filter CF may be bonded to each other by a separate filler 160. The filler 160 may be an optically clear resin layer (OCR) or an optically clear adhesive film (OCA).

The color filter CF may be formed to be patterned for each of the subpixels SP1, SP2, SP3 and SP4, and a black matrix BM may be provided between the color filters CF. The black matrix BM may be provided between the subpixels SP1, SP2, SP3 and SP4 to prevent color mixture from occurring between adjacent subpixels SP1, SP2, SP3 and SP4, and light incident from the outside may be prevented from being reflected toward the plurality of lines provided among the subpixels SP1, SP2, SP3 and SP4, for example, the scan lines SCANL, the data lines DL, the pixel power lines VDDL, the common power lines VSSL, the reference lines RL, the touch lines TL, the sensing line SSL, and so on.

In the transparent display panel 110 according to one or more example embodiments of the present disclosure, the touch sensor electrode TSE of the touch sensor TS and the cathode electrode CE of the light emitting element may be formed on the same layer by using the first undercut structure UC1. In the transparent display panel 110 according to one or more example embodiments of the present disclosure, the manufacturing process associated with a touch sensor may be simplified, and a separate (or additional) mask for the touch sensor electrode TSE is not required. Therefore, the transparent display panel 110 according to one or more example embodiments of the present disclosure may optimize the manufacturing process and improve energy efficiency in the manufacturing process.

Further, in the transparent display panel 110 according to one or more example embodiments of the present disclosure, the first undercut structure UC1 may be formed using the planarization layer PLN and the plurality of inorganic insulating layers, so that the first undercut structure UC1 may be formed without loss of light transmittance.

Furthermore, in the transparent display panel 110 according to one or more example embodiments of the present disclosure, the plurality of undercuts UC11 and UC12 may be formed using the first undercut structure UC1, so that the touch sensor electrode TSE of the touch sensor TS and the cathode electrode CE of the light emitting element may be more certainly (e.g., clearly by a distinct amount) separated from each other. Therefore, the transparent display panel 110 according to one or more example embodiments of the present disclosure may reduce a defect rate that may result when the touch sensor electrode TSE of the touch sensor TS and the cathode electrode CE of the light emitting element are connected to each other.

In addition, in the transparent display panel 110 according to one or more example embodiments of the present disclosure, the touch lines TL may be disposed below the light emitting element, so that emission efficiency of the pixel P may be prevented from being deteriorated due to the touch lines TL.

Further, in the transparent display panel 110 according to one or more example embodiments of the present disclosure, the touch lines TL may be disposed so as not to overlap the circuit areas CA1, CA2, CA3 and CA4, whereby influence due to a circuit element may be minimized and at the same time uniformity of parasitic capacitance may be improved.

Further, in the transparent display panel 110 according to one or more example embodiments of the present disclosure, the plurality of touch lines TL may be disposed in the first non-transmissive area NTA1, and only one touch bridge line TBL for connecting the plurality of touch sensors TS may be provided in the second non-transmissive area NTA2, whereby reduction in a size of the transmissive area TA or light transmittance due to the plurality of touch lines TL and the touch bridge line TBL may be minimized.

In the transparent display panel 110 according to one or more example embodiments of the present disclosure, the touch sensor electrode TSE of the touch sensor TS and the cathode electrode CE of the light emitting element may be separated from each other by the first undercut structure UC1. However, particles may be generated in the first undercut structure UC1 during the manufacturing process, and in this case, the touch sensor electrode TSE of the touch sensor TS and the cathode electrode CE of the light emitting element may be electrically connected to each other without being separated from each other.

Since all of the plurality of touch sensors TS included in one touch block TB are electrically connected to each other, even though a defect occurs in only one of the plurality of touch sensors TS, all of the touch sensors TS included in the corresponding touch block TB do not operate normally.

Therefore, when the touch sensor electrode TSE of the touch sensor TS and the cathode electrode CE of the light emitting element are connected to each other to generate a defective touch sensor TS, a user's touch is not sensed in the entire touch block TB in which the defective touch sensor TS is included. A plurality of defective touch sensors TS may be generated, and the plurality of defective touch sensors TS may be disposed in their respective touch blocks TB different from each other. In this case, all of the plurality of touch blocks TB in or on which the plurality of defective touch sensors TS are disposed may not sense a touch, and as a result, a touch defect rate of the transparent display panel 110 may be increased.

The transparent display panel 110 according to one or more example embodiments of the present disclosure may include an element capable of specifying an area in which a defective touch sensor TS among the plurality of touch sensors TS included in one touch block TB is included. In addition, the transparent display panel 110 according to one or more example embodiments of the present disclosure may electrically separate the touch sensors TS in a specific area from the touch bridge line TBL through a repair process.

An element capable of specifying an area in which a defective touch sensor TS is included is described in more detail with reference to FIGS. 3A, 3B and 7 to 9.

Figure 7:
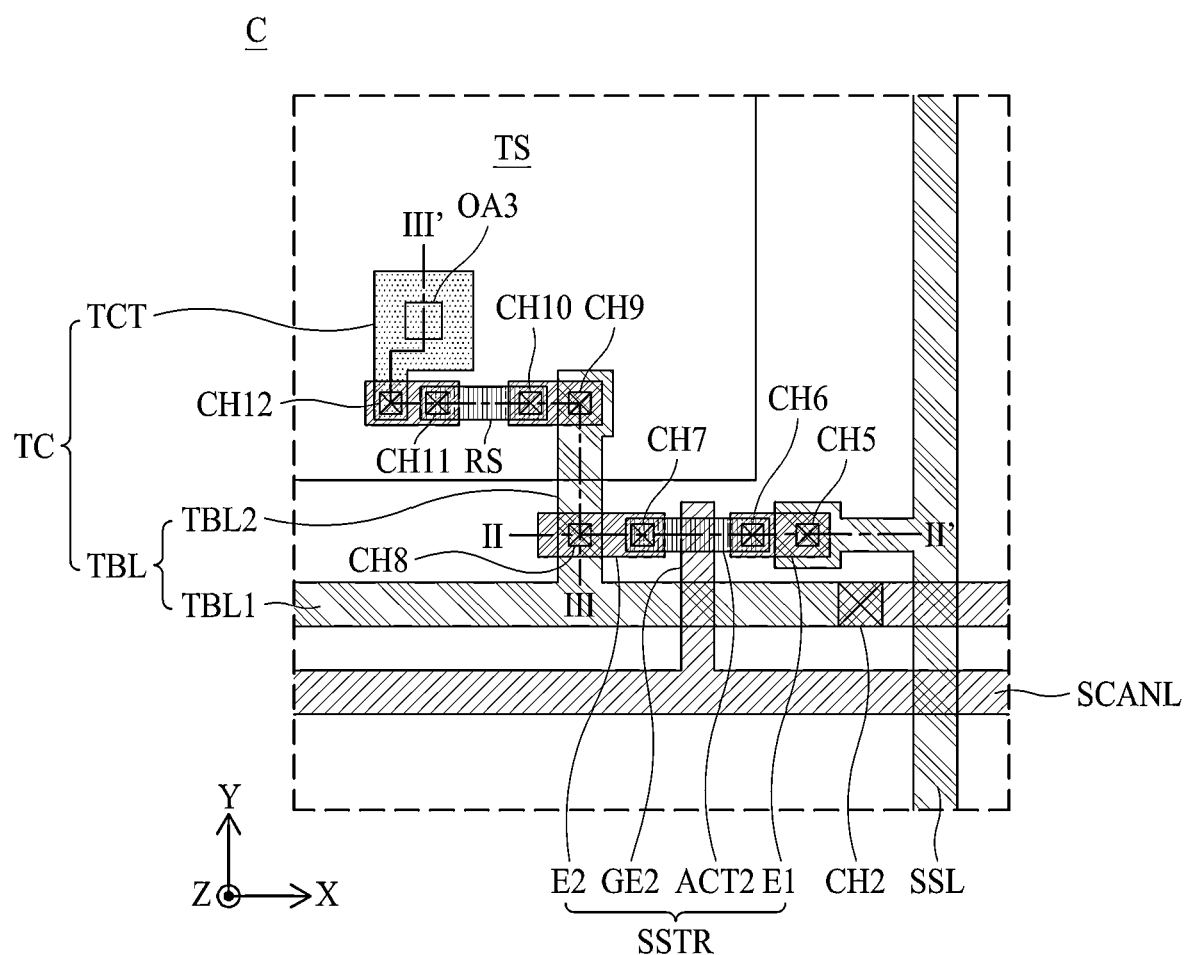
FIG. 7 is a view illustrating an example of a sensing transistor and a touch connection portion, which are provided in an area C of FIG. 3A.
Figure 8:
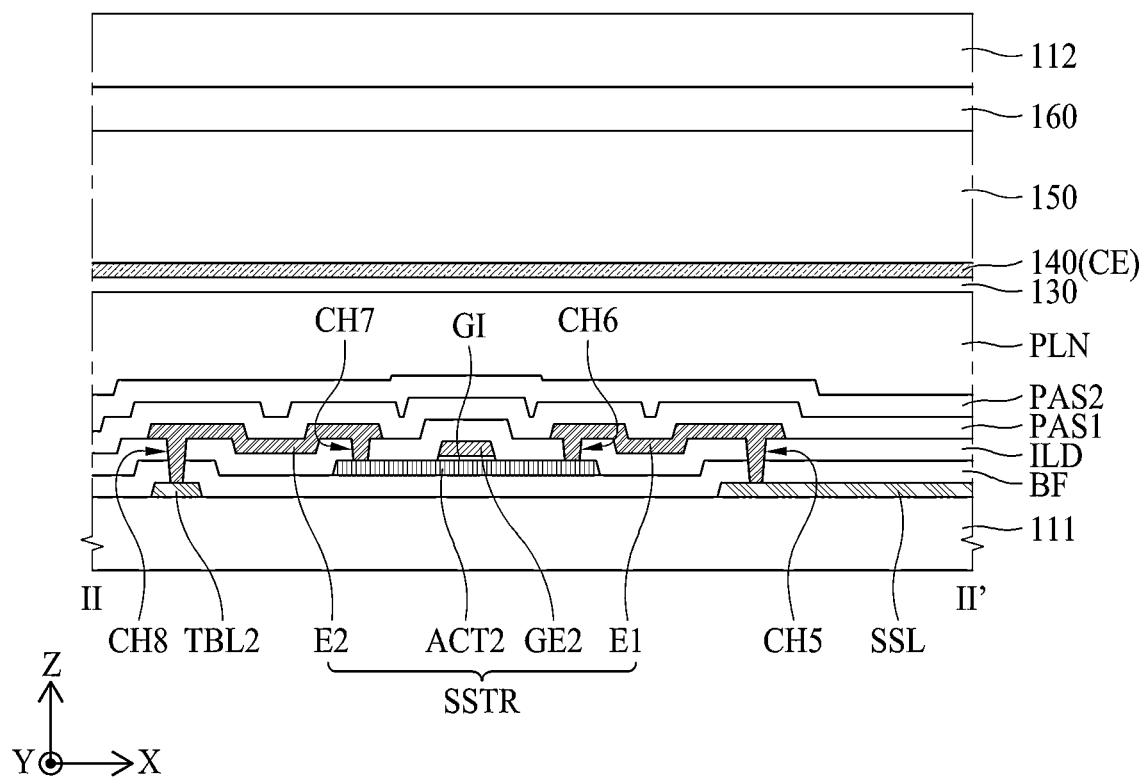
FIG. 8 is an example of a cross-sectional view taken along a line II-II' of FIG. 7.
Figure 9:
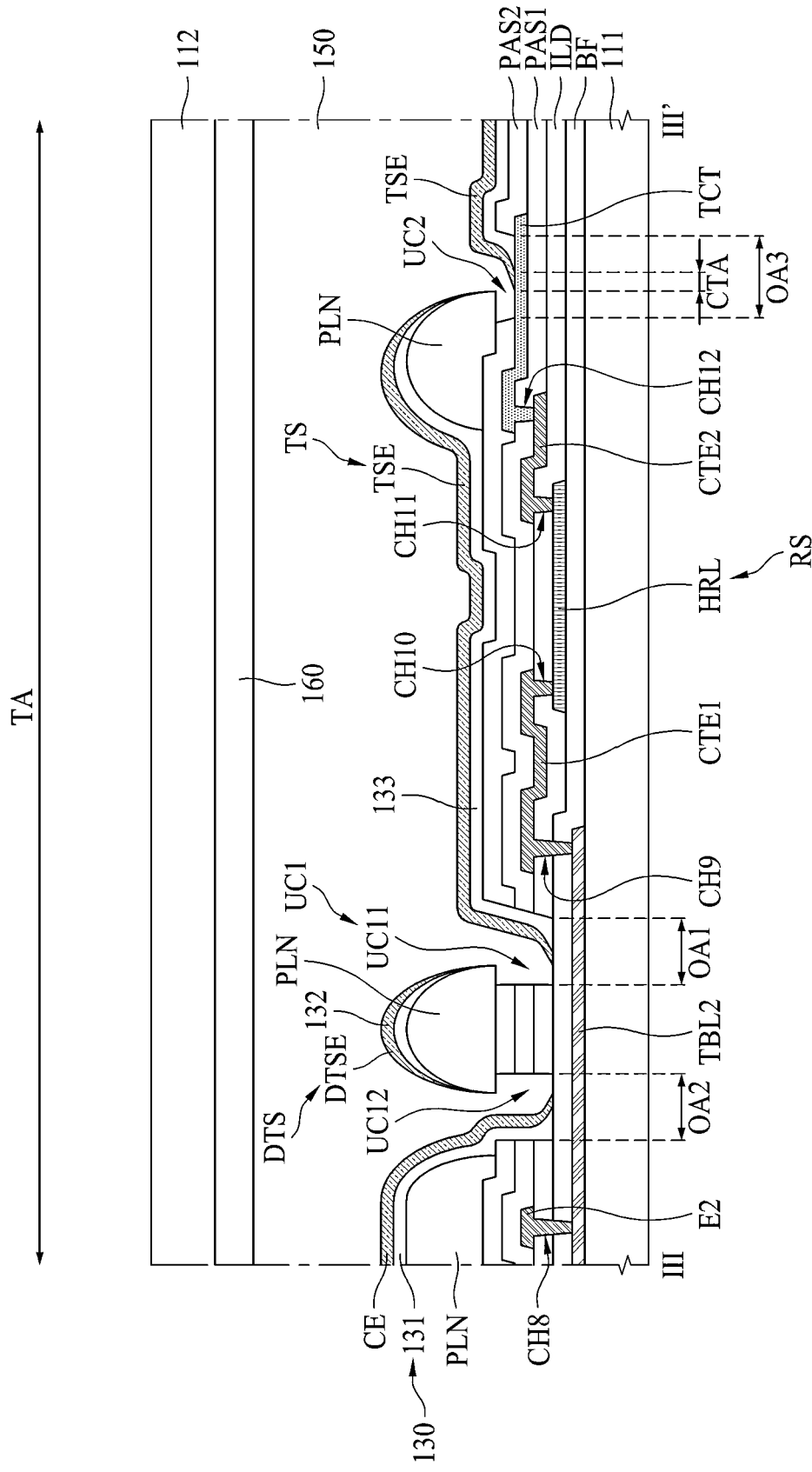
FIG. 9 is an example of a cross-sectional view taken along a line III-III' of FIG. 7.

FIG. 7 is a view illustrating an example of a sensing transistor and a touch connection portion, which are provided in an area C of FIG. 3A, FIG. 8 is an example of a cross-sectional view taken along a line II-II' of FIG. 7, and FIG. 9 is an example of a cross-sectional view taken along a line III-III' of FIG. 7.

Referring to FIGS. 3A, 3B and 7 to 9, the transparent display panel 110 according to one or more example embodiments of the present disclosure may further include a sensing transistor SSTR connecting the touch sensor TS to the sensing line SSL, and a touch connection portion TC connecting the touch sensor TS to the touch line TL. A defective touch sensor TS may be detected using the sensing transistor SSTR and the touch connection portion TC.

Further, in the transparent display panel 110 according to one or more example embodiments of the present disclosure, when the defective touch sensor TS is detected, the touch connection portion TC connecting the touch sensor TS to the touch line TL may be cut by laser, so that the defective touch sensor TS and the touch line TL may be electrically separated from each other. As a result, the remaining touch sensors TS of the corresponding touch block TB may operate normally.

The sensing transistor SSTR may be connected to the touch sensor TS and the sensing line SSL to transfer a voltage of the touch sensor TS to the sensing line SSL. In detail, as shown in FIGS. 3A, 3B and 7, the sensing transistor SSTR may be provided between the touch sensor TS and second signal lines SL2.

Referring to FIGS. 7 to 9, the sensing transistor SSTR may be disposed to be spaced apart from the first undercut structure UC1. The sensing transistor SSTR does not overlap the touch sensor electrode TSE separated therefrom by the first undercut structure UC1, and may be disposed to at least partially overlap the cathode electrode CE. In one or more examples, the sensing transistor SSTR may be located in the transmissive area TA, the cathode electrode CE may be disposed in the non-transmissive area NTA as well as in the transmissive area TA, and the sensing transistor SSTR (located in the transmissive area TA) may at least partially overlap the cathode electrode CE (located in the transmissive area TA).

Referring to FIGS. 3A, 3B and 7 to 9, the sensing transistor SSTR may include an active layer ACT2, a gate electrode GE2, a first electrode E1 and a second electrode E2. Any one of the first electrode E1 and the second electrode E2 of the sensing transistor SSTR may be a source electrode, and the other one may be a drain electrode. The active layer ACT2, the gate electrode GE2, the first electrode E1 and the second electrode E2 of the sensing transistor SSTR may be provided between the touch sensor TS and the second signal lines SL2 on a horizontal plane.

The gate electrode GE2 of the sensing transistor SSTR may be electrically connected to the scan line SCANL. The scan line SCANL may supply a scan signal to the gate electrode GE2 of the sensing transistor SSTR. The active layer ACT2 of the sensing transistor SSTR may be provided to at least partially overlap the gate electrode GE2 below the gate electrode GE2. The active layer ACT2 may be connected to the first electrode E1 at one end through a sixth contact hole CH6, and may be connected to the second electrode E2 at the other end through a seventh contact hole CH7.

The first electrode E1 of the sensing transistor SSTR may be connected to the sensing line SSL transistor at one end through a fifth contact hole CH5, and may be connected to the active layer ACT2 through the sixth contact hole CH6 at the other end. The second electrode E2 of the sensing transistor SSTR may be connected to the active layer ACT2 at one end through the seventh contact hole CH7, and may be connected to the touch bridge line TBL at the other end through an eighth contact hole CH8. Since the touch bridge line TBL is electrically connected to the touch sensor TS, the second electrode E2 of the sensing transistor SSTR may be electrically connected to the touch sensor TS through the touch bridge line TBL (e.g., a second touch bridge line TBL2).

As described above, the gate electrode GE2 of the sensing transistor SSTR may be connected to the scan line SCANL, and the first electrode E1 of the sensing transistor SSTR may be connected to the sensing line SSL. Furthermore, the second electrode E2 of the sensing transistor SSTR may be connected to the touch sensor electrode TSE of the touch sensor TS. The sensing transistor SSTR may be turned on in response to the scan signal applied through the scan line SCANL. When the sensing transistor SSTR is turned on, a voltage of the touch sensor electrode TSE may be transferred to the sensing line SSL.

The touch connection portion TC may connect the touch sensor TS to the touch line TL. The touch connection portion TC may include a touch bridge line TBL, a resistance sensor RS including a high resistance area, and a touch contact electrode TCT.

The touch bridge line TBL may connect any one of the plurality of touch lines TL with the touch sensor TS. To this end, the touch bridge line TBL may include a first touch bridge line TBL1 and a second touch bridge line TBL2.

The first touch bridge line TBL1 may be connected to any one of the plurality of touch lines TL through a first contact hole CH1. The first touch bridge line TBL1 may be extended in the second direction (e.g., X-axis direction).

The second touch bridge line TBL2 may be protruded from the first touch bridge line TBL1 and extended toward the touch sensor TS. The second touch bridge line TBL2 may be extended to an area overlapping the touch sensor TS across the first undercut structure UC1. In one or more examples, the second touch bridge line TBL2 may be extended to the touch sensor TS, and the second touch bridge line TBL2 may overlap the first undercut structure UC1.

The second touch bridge line TBL2 may electrically connect the first touch bridge line TBL2 to the resistance sensor RS. In detail, one end of the second touch bridge line TBL2 may be connected to the first touch bridge line TBL1, and the other end of the second touch bridge line TBL2 may be connected to the first connection electrode CTE1 through a ninth contact hole CH9. The second touch bridge line TBL2 may be connected to the resistance sensor RS through the first connection electrode CTE1, but the present disclosure is not limited thereto. The second touch connection line TBL2 may be directly connected to the resistance sensor RS.

The second touch bridge line TBL2 may be formed in a layer provided between the first substrate 111 and the driving transistor DTR. In one example embodiment, the second touch bridge line TBL2 may be formed of the same material as that of the light-shielding layer LS on the same layer as the light-shielding layer LS. The second touch bridge line TBL2 may be extended to the resistance sensor RS, which is disposed to overlap the touch sensor TS. In order to connect the second touch bridge line TBL2 to the resistance sensor RS, the second touch bridge line TBL2 crosses (and is required to cross) the first undercut structure UC1. The first undercut structure UC1 may be formed through a wet etching process. In the transparent display panel 110 according to one or more example embodiments of the present disclosure, the second touch bridge line TBL2 may be formed on the same layer as the light-shielding layer LS so that the second touch bridge line TBL2 may be prevented from being lost during the wet etching process for forming the first undercut structure UC1.

The first connection electrode CTE1 may electrically connect the second touch bridge line TBL2 to the resistance sensor RS. The first connection electrode CTE1 may be connected to the second touch bridge line TBL2 at one end through the ninth contact hole CH9, and may be connected to the resistance sensor RS at the other end through a tenth contact hole CH10. In one example embodiment, the first connection electrode CTE1 may be disposed on the same layer as the source electrode SE1 and the drain electrode DE1 of the driving transistor DTR.

The resistance sensor RS is disposed between the second touch bridge line TBL2 and the touch contact electrode TCT on a horizontal plane. In one example embodiment, the resistance sensor RS may include a high resistance line HRL. One end of the high resistance line HRL may be connected to the first connection electrode CTE through the tenth contact hole CH10, and the other end of the high resistance line HRL may be connected to the second connection electrode CTE2 through an eleventh contact hole CH11. Although FIG. 9 illustrates that the high resistance line HRL is connected to the second touch bridge line TBL2 through the first connection electrode CTE1, the present disclosure is not limited thereto. In another example embodiment, the high resistance line HRL may be directly connected with the second touch bridge line TBL2.

The high resistance line HRL may include a silicon-based semiconductor material or an oxide-based semiconductor material to implement high resistance. For example, the high resistance line HRL may include the same material on the same layer as the active layer ACT1 of the driving transistor DTR.

The second connection electrode CTE2 may electrically connect the resistance sensor RS to the touch contact electrode TCT. One end of the second connection electrode CTE2 may be connected to the high resistance line HRL through the eleventh contact hole CH11, and the other end of the second connection electrode CTE2 may be connected to the touch contact electrode TCT through a twelfth contact hole CH12. In one example embodiment, the second connection electrode CTE2 may be disposed on the same layer as the source electrode SE1 and the drain electrode DE1 of the driving transistor DTR.

The touch contact electrode TCT may be provided in the transmissive area TA. The touch contact electrode TCT may be disposed between the high resistance line HRL and the touch sensor electrode TSE to electrically connect the high resistance line HRL to the touch sensor electrode TSE. The touch contact electrode TCT may be connected to the high resistance line HRL through the second connection electrode CTE2.

At least a portion of an upper surface of the touch contact electrode TCT may be exposed by the second undercut structure UC2, and the touch sensor electrode TSE may be connected to the exposed upper surface. In detail, the touch contact electrode TCT may be formed on a layer provided between the buffer layer BF and the second passivation layer PAS2.

In one example embodiment, the touch contact electrode TCT may be provided between the first passivation layer PAS1 and the second passivation layer PAS2. In this case, the second passivation layer PAS2 may be provided with a third opening area OA3 that exposes at least a portion of the upper surface of the touch contact electrode TCT. The second undercut structure UC2 may be formed with an organic insulating pattern (e.g., the planarization layer PLN), and the organic insulating pattern may protrude outwardly more than the second passivation layer PAS2 in the third opening area OA3 of the second passivation layer PAS2. The organic insulating pattern may be formed of the same material on the same layer as the planarization layer PLN on the second passivation layer PAS2. Therefore, the second undercut structure UC2 may expose at least a portion of the lower surface of the planarization layer PLN, and may expose at least a portion of the upper surface of the touch contact electrode TCT without being provided with the second passivation layer PAS2 below the exposed lower surface. That is, in this example, the second passivation layer PAS2 is not provided in an area below the exposed lower surface of the planarization layer PLN. The second undercut structure UC2 may be provided in an area in which the first undercut structure UC1 is formed. That is, the second undercut structure UC2 may be disposed in an area in which the touch sensor TS is provided.

The touch sensor electrode TSE may be deposited on the exposed upper surface of the touch contact electrode TCT to form a contact area CTA, and may be electrically connected to the touch contact electrode TCT. The touch contact electrode TCT may transfer a change in the capacitance of the touch sensor electrode TSE to the touch line TL through the high resistance line HRL and the touch bridge line TBL.

Furthermore, in the transparent display panel 110 according to one or more example embodiments of the present disclosure, a defective touch sensor TS may be detected using the sensing transistor SSTR and the resistance sensor RS. In detail, as described above, particles may be generated in the first undercut structure UC1, and in this case, the touch sensor electrode TSE of the touch sensor TS and the cathode electrode CE of the light emitting element may be electrically connected to each other without being separated from each other. When a different voltage is applied to each of the touch line TL and the common power line VSSL, a current flows from the touch sensor electrode TSE to the cathode electrode CE in the defective touch sensor TS.

For example, a first voltage, e.g., 20V may be applied to the touch line TL, and a second voltage, e.g., OV may be applied to the common power line VSSL. Since the touch sensor electrode TSE and the cathode electrode CE of the light emitting element are electrically connected to each other, a current path may be generated from the touch sensor electrode TSE of the defective touch sensor TS to the cathode electrode CE. In this example, when the resistance sensor RS is provided on the current path, a voltage of the defective touch sensor TS is reduced by high resistance of the resistance sensor RS. On the other hand, since the current does not flow to the touch sensor electrode TSE, the voltage applied from the touch line TL may be maintained.

The sensing transistor SSTR connected to the touch sensor TS may be turned on in accordance with the scan signal applied through the scan line SCANL. When the sensing transistor SSTR is turned on, a voltage of the touch sensor electrode TSE may be applied to the sensing line SSL. In this example, when the touch sensor TS is a normal touch sensor, the voltage of the touch sensor TS may be the same as or similar to the first voltage applied to the touch line TL, for example, 20V. On the other hand, when the touch sensor TS is the defective touch sensor TS, since the voltage of the defective touch sensor TS is reduced by high resistance of the resistance sensor RS, the voltage of the touch sensor TS may have a value which is more significantly reduced than the first voltage applied to the touch line TL, for example, 20V. In one or more examples, a resistance value of the high resistance area (e.g., HRL extending between CH10 and CH11) of the resistance sensor RS may be higher than a resistance value of a touch bridge line (e.g., TBL; TBL1; TBL2; TBL extending between CH9 and TL (where TL is the TL closest to CH9); TBL1 extending between CH8 and TL (where TL is the TL closest to CH8); or TBL2 extending between CH8 and CH9).

As described above, in the transparent display panel 110 according to one or more example embodiments of the present disclosure, the defective touch sensor TS may be detected using the sensing transistor SSTR and the high resistance area. When the defective touch sensor TS is detected, the touch sensor TS may be separated from the touch line TL in the transparent display panel 110 by laser cutting of the touch connection portion TC connected to the detected touch sensor TS, particularly, the second touch bridge line TBL2. Therefore, the remaining touch sensors TS of the corresponding touch block TB may operate normally.

In the transparent display panel 110 according to one or more example embodiments of the present disclosure, the defective touch sensor TS may be detected accurately within one touch block TB. Therefore, the transparent display panel 110 according to one or more example embodiments of the present disclosure may reduce a touch defect rate and improve a touch recognition rate.

Meanwhile, the transparent display panel 110 according to one or more example embodiments of the present disclosure is characterized in that the sensing transistor SSTR is disposed between the touch sensor TS and the second signal line SL2. That is, in the transparent display panel 110 according to one or more example embodiments of the present disclosure, the sensing transistor SSTR does not overlap the touch sensor TS, and may be spaced apart from the first undercut structure UC1. In one or more examples, the sensing transistor SSTR may be provided between the first undercut structure UC1 and the second signal line SL2 (e.g., a scan line SCANL).

The first electrode E1 of the sensing transistor SSTR may be connected to the sensing line SSL, and the gate electrode GE2 of the sensing transistor SSTR may be connected to the scan line SCANL. Therefore, if the sensing transistor SSTR is disposed to overlap the touch sensor TS, the sensing line SSL and the scan line SCANL have no option but to cross the first undercut structure UC1. The sensing line SSL and the scan line SCANL may be formed on the same layer as a layer provided below the first undercut structure UC1, for example, the light-shielding layer LS, in order to prevent the first undercut structure UC1 from being damaged.

However, when the first undercut structure UC1 is formed, an etchant for etching a portion of the plurality of inorganic insulating layers may etch the buffer layer BF due to over-etching. A case in which over-etching occurs in the process of forming the first undercut structure UC1 is described with reference to FIGS. 10A to 10C.

Figure 10A:
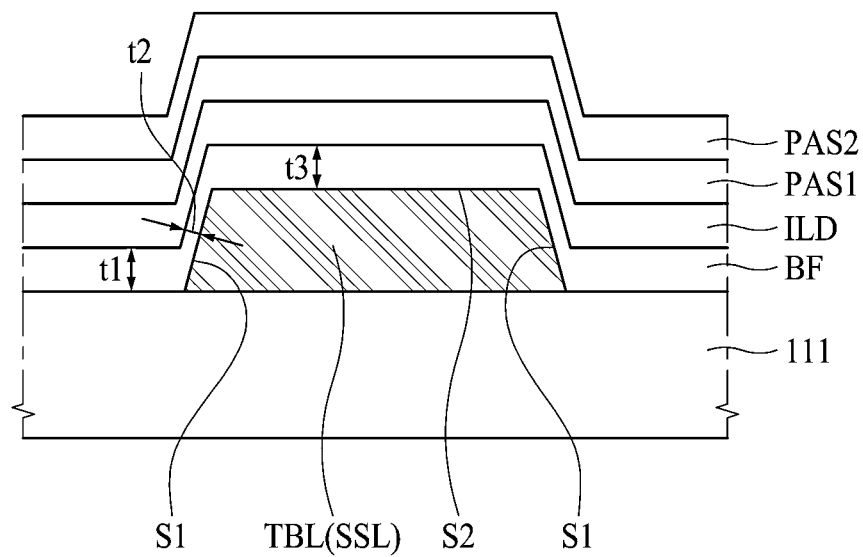
FIG. 10A is a view illustrating an example of a stacked structure of an undercut formation area before a wet etching process.
Figure 10B:
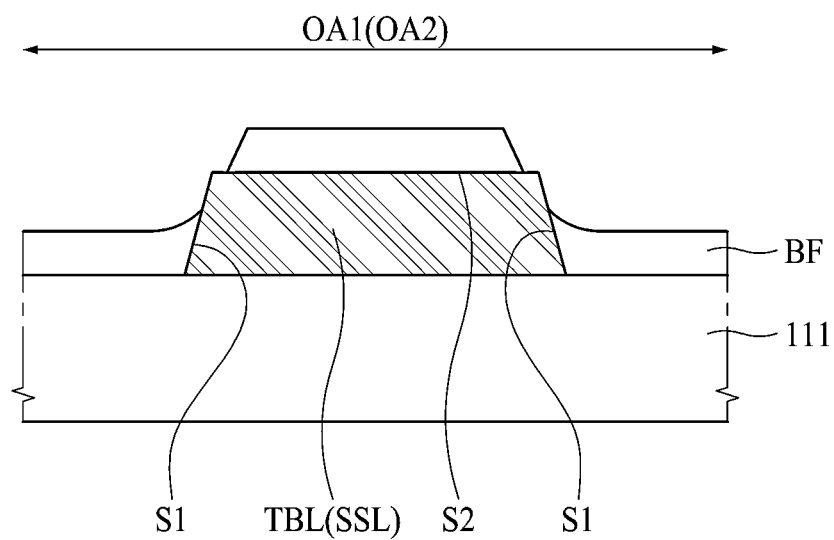
FIG. 10B is a view illustrating an example of over-etching in a wet etching process for the stacked structure shown in FIG. 10A.
Figure 10C:
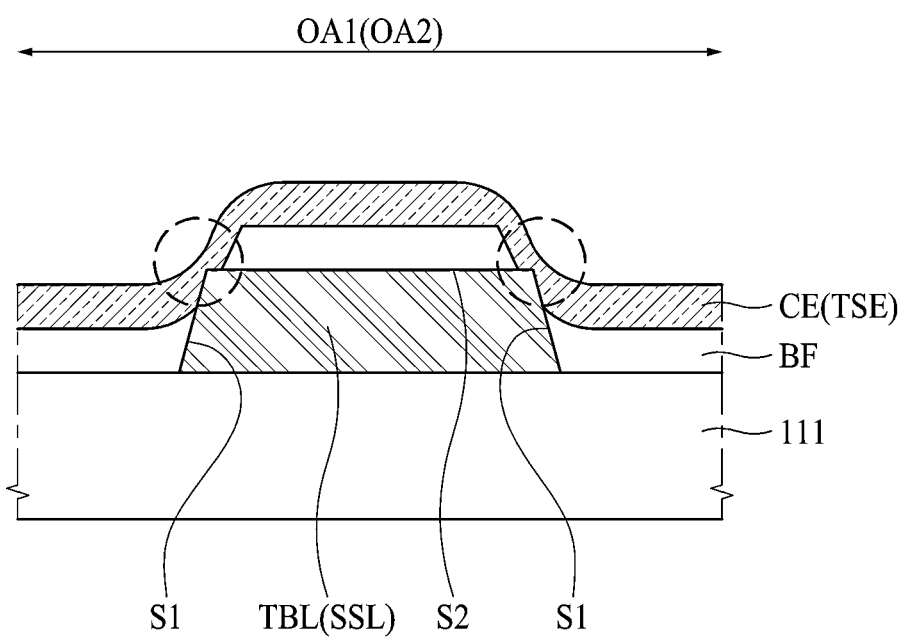
FIG. 10C is a view illustrating an example in which a cathode electrode or a touch sensor electrode is formed on the stacked structure shown in FIG. 10B.

FIG. 10A is a view illustrating an example of a stacked structure of an undercut formation area before a wet etching process, FIG. 10B is a view illustrating an example of over-etching in a wet etching process for the stacked structure shown in FIG. 10A, and FIG. 10C is a view illustrating an example in which a cathode electrode or a touch sensor electrode is formed on the stacked structure shown in FIG. 10B.

Referring to FIG. 10A, before a wet etching process, a plurality of inorganic insulating layers, for example, a buffer layer BF, an interlayer insulating layer ILD, a first passivation layer PAS1 and a second passivation layer PAS2 are stacked on a signal line such as a sensing line SSL or a touch bridge line TBL.

In the transparent display panel 110 according to one or more example embodiments of the present disclosure, a first opening area OA1 and a second opening area OA2 may be formed to form a first undercut structure UC1. In the transparent display panel 110 according to one or more example embodiments of the present disclosure, the first opening area OA1 and the second opening area OA2 may be formed in the plurality of inorganic insulating layers through a wet etching process using an etchant. As an example, a buffered oxide etchant (BOE) in which hydrofluoric acid (HF) and ammonium fluoride (NH+F) are mixed may be used as the etchant.

In this example, it is preferable that the first undercut structure UC1 has a maximum step difference in order to certainly (e.g., clearly and distinctly) separate the cathode electrode CE and the touch sensor electrode TSE, which are formed on the same layer, from each other. The first undercut structure UC1 may form a maximum step difference from the organic pattern by forming the first opening area OA1 and the second opening area OA2 in the plurality of inorganic insulating layers (e.g., the interlayer insulating layer ILD, the first passivation layer PAS1 and the second passivation layer PAS2) except that the buffer layer BF directly covers the sensing line SSL or the touch bridge line TBL.

In the transparent display panel 110 according to one or more example embodiments of the present disclosure, since a total thickness of the interlayer insulating layer ILD, the first passivation layer PAS1 and the second passivation layer PAS2 is large, the first opening area OA1 and the second opening area OA2 may be formed in the interlayer insulating layer ILD, the first passivation layer PAS1 and the second passivation layer PAS2 by using a high-concentration etchant. Wet etching using the high-concentration etchant may cause over-etching, and thus the etchant may reach (and etch) the buffer layer BF.

In addition, the buffer layer BF has a relatively thin thickness compared with other inorganic insulating layers, and may be formed to be thinner at a tapered side S1 of the sensing line SSL, the scan line SCANL or the touch bridge line TBL. That is, a thickness t2 of the buffer layer BF formed on the side S1 of the sensing line SSL, the scan line SCANL or the touch bridge line TBL may be thinner than a thickness t1 of the buffer layer BF formed on an upper surface of the first substrate 111 and a thickness t3 of the buffer layer BF formed on an upper surface S2 of the sensing line SSL, the scan line SCANL or the touch bridge line TBL. Therefore, when the buffer layer BF is over-etched by the high-concentration etchant, as shown in FIG. 10B, the sensing line SSL, the scan line SCANL or the touch bridge line TBL is likely to be exposed at the side S1.

The sensing line SSL, the scan line SCANL or the touch bridge line TBL may be damaged by the etchant permeated into the exposed side S1. Further, when the organic light emitting layer 130 and the second electrode layer 140 are sequentially stacked, the sensing line SSL, the scan line SCANL or the touch bridge line TBL can be in contact with the second electrode layer 140 at the exposed side S1 as shown in FIG. 10C. Therefore, the sensing line SSL, the scan line SCANL or the touch bridge line TBL may generate short with (or may be in contact with) the second electrode layer 140.

In this case, the second electrode layer 140 may be the cathode electrode CE of the light emitting element or the touch sensor electrode TSE of the touch sensor TS in accordance with the position of the undercut. When the sensing line SSL or the scan line SCANL generates short with the cathode electrode CE, the sensing transistor SSTR cannot operate normally and cannot detect a defective touch sensor, whereby a touch defect rate may be increased.

In the transparent display panel 110 according to one or more example embodiments of the present disclosure, the sensing transistor SSTR may be provided between the touch sensor TS and the second signal line SL2 and spaced apart from the first undercut structure UC1 in order to prevent short from occurring between the sensing line SSL or the scan line SCANL and the cathode electrode CE. Therefore, in the transparent display panel 110 according to one or more example embodiments of the present disclosure, the sensing line SSL or the scan line SCANL is not extended across the first undercut structure UC1 and thus may prevent a contact defect with the cathode electrode CE below the first undercut structure UC1 from occurring.

Meanwhile, the touch bridge line TBL according to one or more example embodiments of the present disclosure may be extended to an area, in which the touch sensor TS is formed, across the first undercut structure UC1. When the touch bridge line TBL generates short with the touch sensor electrode TSE, the touch bridge line TBL and the touch sensor electrode TSE correspond to the same node and thus are electrically connected to each other, whereby there is no influence (or impact) on the touch bridge line TBL and the touch sensor electrode TSE. In addition, when the touch bridge line TBL generates short with the cathode electrode CE, a defect may be detected from the sensing transistor SSTR. In the transparent display panel 110 according to one or more example embodiments of the present disclosure, the touch bridge line TBL connected to the touch sensor TS detected as a defect may be cut by laser, so that the other touch sensors TS may operate normally. In other words, in the transparent display panel 110 according to one or more example embodiments of the present disclosure, even though the touch bridge line TBL is extended across the first undercut structure UC1, there is no influence (or impact) on the operation of the touch sensors TS.

Various example embodiments and aspects of the present disclosure are described below for convenience. These are provided as examples, and do not limit the subject technology.

In accordance with one or more example embodiments of the present disclosure, a transparent display device with a touch sensor may be provided. The transparent display device may include: a substrate; a transmissive area; a non-transmissive area; a plurality of subpixels provided in the non-transmissive area, the plurality of subpixels including a light emitting element, the light emitting element including an anode electrode, a light emitting layer and a cathode electrode; the touch sensor disposed in the transmissive area, the touch sensor including a touch sensor electrode; and a sensing transistor for sensing a voltage of the touch sensor. The cathode electrode and the touch sensor electrode may be provided on a same layer and may be separated by a first undercut structure. The cathode electrode may extend to the transmissive area such that the cathode electrode is located in the transmissive area and in the non-transmissive area. The sensing transistor may be disposed to overlap the cathode electrode located in the transmissive area.

According to one or more example embodiments of the present disclosure, the first undercut structure may have a closed shape on a plane in the transmissive area.

According to one or more example embodiments of the present disclosure, the first undercut structure may be provided between the touch sensor and the non-transmissive area.

According to one or more example embodiments of the present disclosure, the sensing transistor may be disposed to be spaced apart from the first undercut structure.

According to one or more example embodiments of the present disclosure, the transparent display device may further include: a touch line provided in the non-transmissive area; and a touch connection portion connecting the touch line to the touch sensor, wherein the sensing transistor may be electrically connected to the touch sensor through the touch connection portion.

According to one or more example embodiments of the present disclosure, the touch connection portion may include a touch bridge line. The touch bridge line may be electrically connected to the sensing transistor. The touch bridge line may extend to the touch sensor. The touch bridge line may overlap the first undercut structure.

According to one or more example embodiments of the present disclosure, the transparent display device may further include: a driving transistor provided in each of the plurality of subpixels; and a light-shielding layer provided between the substrate and the driving transistor, wherein the touch bridge line may be provided on a same layer as the light-shielding layer.

According to one or more example embodiments of the present disclosure, the transparent display device may further include a buffer layer provided on the touch bridge line, wherein the buffer layer may have an upper surface exposed below the first undercut structure.

According to one or more example embodiments of the present disclosure, the touch connection portion may include a resistance area. A resistance value of the high resistance area may be higher than a resistance value of the touch bridge line.

According to one or more example embodiments of the present disclosure, the touch connection portion may include a resistance line made of a silicon-based semiconductor material or an oxide-based semiconductor material in the resistance area.

According to one or more example embodiments of the present disclosure, the touch connection portion may include a touch contact electrode electrically connected to the touch sensor electrode in the transmissive area.

According to one or more example embodiments of the present disclosure, at least a portion of an upper surface of the touch contact electrode may be exposed by a second undercut structure, and the touch sensor electrode may be in contact with the exposed upper surface.

According to one or more example embodiments of the present disclosure, the transparent display device may further include: a sensing line provided in the non-transmissive area and electrically connected to the sensing transistor; and a scan line provided in the non-transmissive area, the scan line for supplying a scan signal to the sensing transistor, wherein the sensing transistor may be configured to be turned on in response to the scan signal to transfer the voltage of the touch sensor to the sensing line, and wherein the touch sensor may be connected to the sensing transistor.

According to one or more example embodiments of the present disclosure, the first undercut structure may include a plurality of inorganic insulating patterns and an organic insulating pattern; the plurality of inorganic insulating patterns may have a first width; the organic insulating pattern may be provided on the plurality of inorganic insulating patterns; and the organic insulating pattern may have a second width greater than the first width.

In accordance with one or more example embodiments of the present disclosure, a transparent display device with a touch sensor may be provided. The transparent display device may include: a substrate; a transmissive area; a non-transmissive area; a plurality of subpixels provided in the non-transmissive area; a first signal line extending in a first direction in the non-transmissive area; a second signal line extending in a second direction in the non-transmissive area; the touch sensor disposed in the transmissive area; and a sensing transistor provided between the touch sensor and the second signal line, the sensing transistor electrically connected to the touch sensor to sense a voltage of the touch sensor.

According to one or more example embodiments of the present disclosure, the sensing transistor may include an active layer, a gate electrode, a first electrode connected to one end of the active layer, and a second electrode connected to the other end of the active layer; the first signal line may include a sensing line electrically connected to the first electrode of the sensing transistor; and the second signal line may include a scan line for supplying a scan signal to the gate electrode of the sensing transistor.

According to one or more example embodiments of the present disclosure, the first signal line may further include a touch line; the second signal line may further include a touch bridge line connecting the touch line to the touch sensor; and the second electrode of the sensing transistor may be electrically connected to the touch bridge line.

According to one or more example embodiments of the present disclosure, each of the plurality of subpixels may include a light emitting element; the light emitting element may include an anode electrode, a light emitting layer and a cathode electrode; the touch sensor may include a touch sensor electrode; the cathode electrode of the light emitting element and the touch sensor electrode of the touch sensor may be provided on a same layer; the cathode electrode may extend to the transmissive area such that the cathode electrode is located in the transmissive area and in the non-transmissive area; and the sensing transistor may overlap the cathode electrode located in the transmissive area.

According to one or more example embodiments of the present disclosure, the cathode electrode of the light emitting element and the touch sensor electrode of the touch sensor may be separated by an undercut structure; and the sensing transistor may be provided between the undercut structure and the second signal line on a horizontal plane.

According to one or more aspects of the present disclosure, the following advantageous features or effects may be obtained.

In one or more aspects of the present disclosure, the touch sensor electrode of the touch sensor and the cathode electrode of the light emitting element may be simultaneously formed using an undercut structure, whereby the manufacturing process associated with the touch sensor may be simplified and a separate (or additional) mask for the touch sensor electrode is not required. Therefore, one or more aspects of the present disclosure may optimize the manufacturing process and improve energy efficiency in the manufacturing process.

In addition, in one or more aspects of the present disclosure, a defective touch sensor may be detected using a sensing transistor. Therefore, in one or more aspects of the present disclosure, a touch defect rate may be reduced, and a touch recognition rate may be improved.

Furthermore, in one or more aspects of the present disclosure, a sensing transistor may be provided between the touch sensor and the signal line, and may be spaced apart from the undercut structure. Therefore, in one or more aspects of the present disclosure, the sensing line or the scan line is not extended across the undercut structure, and thus may prevent short with the cathode electrode from occurring below the undercut structure.

It will be apparent to those skilled in the art that the present disclosure described above is not limited by the above-described embodiments and the accompanying drawings and that various substitutions, modifications and variations can be made in the present disclosure without departing from the scope of the disclosures. Consequently, the scope of the present disclosure is defined by the accompanying claims and it is intended that all variations or modifications derived from the meaning, scope and equivalent concept of the claims fall within the scope of the present disclosure.

What is claimed is:

1. A transparent display device with a touch sensor, the transparent display device comprising:
    a substrate;
    a transmissive area;
    a non-transmissive area;
    a plurality of subpixels provided in the non-transmissive area, the plurality of subpixels including a light emitting element, the light emitting element including an anode electrode, a light emitting layer and a cathode electrode;
    the touch sensor disposed in the transmissive area, the touch sensor including a touch sensor electrode; and
    a sensing transistor for sensing a voltage of the touch sensor,
    wherein:
    the cathode electrode and the touch sensor electrode are provided on a same layer and are separated by a first undercut structure;

the cathode electrode extends to the transmissive area such that the cathode electrode is located in the transmissive area and in the non-transmissive area; and
the sensing transistor is disposed to overlap the cathode electrode located in the transmissive area.

2. The transparent display device of claim 1, wherein the first undercut structure has a closed shape on a plane in the transmissive area.

3. The transparent display device of claim 1, wherein the first undercut structure is provided between the touch sensor and the non-transmissive area.

4. The transparent display device of claim 1, wherein the sensing transistor is disposed to be spaced apart from the first undercut structure.

5. The transparent display device of claim 1, further comprising:
a touch line provided in the non-transmissive area; and
a touch connection portion connecting the touch line to the touch sensor,
wherein the sensing transistor is electrically connected to the touch sensor through the touch connection portion.

6. The transparent display device of claim 5, wherein the touch connection portion includes a touch bridge line, wherein the touch bridge line is electrically connected to the sensing transistor, wherein the touch bridge line extends to the touch sensor, and wherein the touch bridge line overlaps the first undercut structure.

7. The transparent display device of claim 6, further comprising:
a driving transistor provided in each of the plurality of subpixels; and
a light-shielding layer provided between the substrate and the driving transistor,
wherein the touch bridge line is provided on a same layer as the light-shielding layer.

8. The transparent display device of claim 6, further comprising a buffer layer provided on the touch bridge line, wherein the buffer layer has an upper surface exposed below the first undercut structure.

9. The transparent display device of claim 6, wherein the touch connection portion includes a high resistance area, and wherein a resistance value of the high resistance area is higher than a resistance value of the touch bridge line.

10. The transparent display device of claim 9, wherein the touch connection portion includes a high resistance line made of a silicon-based semiconductor material or an oxide-based semiconductor material in the high resistance area.

11. The transparent display device of claim 5, wherein the touch connection portion includes a touch contact electrode electrically connected to the touch sensor electrode in the transmissive area.

12. The transparent display device of claim 11, wherein at least a portion of an upper surface of the touch contact electrode is exposed by a second undercut structure, and the touch sensor electrode is in contact with the exposed upper surface.

13. The transparent display device of claim 1, further comprising a sensing line provided in the non-transmissive area and electrically connected to the sensing transistor; and
a scan line provided in the non-transmissive area, the scan line for supplying a scan signal to the sensing transistor,
wherein the sensing transistor is configured to be turned on in response to the scan signal to transfer the voltage of the touch sensor to the sensing line, and
wherein the touch sensor is connected to the sensing transistor.

14. The transparent display device of claim 1, wherein:
the first undercut structure includes a plurality of inorganic insulating patterns and an organic insulating pattern;
the plurality of inorganic insulating patterns have a first width;
the organic insulating pattern is provided on the plurality of inorganic insulating patterns; and
the organic insulating pattern has a second width greater than the first width.

15. A transparent display device with a touch sensor, the transparent display device comprising:
a substrate;
a transmissive area;
a non-transmissive area;
a plurality of subpixels provided in the non-transmissive area;
a first signal line extending in a first direction in the non-transmissive area;
a second signal line extending in a second direction in the non-transmissive area;
the touch sensor disposed in the transmissive area; and
a sensing transistor provided between the touch sensor and the second signal line, the sensing transistor electrically connected to the touch sensor to sense a voltage of the touch sensor,
wherein:
the sensing transistor includes an active layer, a gate electrode, a first electrode connected to one end of the active layer, and a second electrode connected to the other end of the active layer;
the first signal line includes a sensing line electrically connected to the first electrode of the sensing transistor; and
the second signal line includes a scan line for supplying a scan signal to the gate electrode of the sensing transistor.

16. The transparent display device of claim 15, wherein:
the first signal line further includes a touch line;
the second signal line further includes a touch bridge line connecting the touch line to the touch sensor; and
the second electrode of the sensing transistor is electrically connected to the touch bridge line.

17. The transparent display device of claim 15, wherein:
each of the plurality of subpixels includes a light emitting element;
the light emitting element includes an anode electrode, a light emitting layer and a cathode electrode;
the touch sensor includes a touch sensor electrode;
the cathode electrode of the light emitting element and the touch sensor electrode of the touch sensor are provided on a same layer;
the cathode electrode extends to the transmissive area such that the cathode electrode is located in the transmissive area and in the non-transmissive area; and
the sensing transistor overlaps the cathode electrode located in the transmissive area.

18. The transparent display device of claim 17, wherein:
the cathode electrode of the light emitting element and the touch sensor electrode of the touch sensor are separated by an undercut structure; and
the sensing transistor is provided between the undercut structure and the second signal line on a horizontal plane.

* * * * *